(12) United States Patent
Akanuma et al.

(10) Patent No.: US 6,343,053 B1
(45) Date of Patent: Jan. 29, 2002

(54) OBJECTIVE LENS DRIVING APPARATUS FOR DRIVING AN OBJECTIVE LENS OF AN OPTICAL DISK DRIVE

(75) Inventors: Goichi Akanuma, Tokyo; Hiroshi Koide, Kanagawa, both of (JP)

(73) Assignee: Ricoh Company, Ltd., Tokyo (JP)

( * ) Notice: Subject to any disclaimer, the term of this patent is extended or adjusted under 35 U.S.C. 154(b) by 0 days.

(21) Appl. No.: 09/382,585

(22) Filed: Aug. 25, 1999

(30) Foreign Application Priority Data

| Aug. 28, 1998 | (JP) | 10-243873 |
| Nov. 9, 1998 | (JP) | 10-317517 |
| Dec. 22, 1998 | (JP) | 10-364609 |
| May 21, 1999 | (JP) | 11-142300 |

(51) Int. Cl.[7] .................................. G11B 7/12
(52) U.S. Cl. .................. 369/44.14; 369/44.11; 359/814
(58) Field of Search ............... 369/44.11, 44.12, 369/44.14, 44.15, 44.22, 44.28, 47.1, 53.1, 112.01; 59/814, 824

(56) References Cited

U.S. PATENT DOCUMENTS 5,388,086 A * 2/1995 Yamasaki et al. ......... 369/44.14
5,566,149 A * 10/1996 Song ......................... 369/44.15

FOREIGN PATENT DOCUMENTS

| JP | 8-221776 | 8/1996 |
| JP | 9-180207 | 7/1997 |

* cited by examiner

*Primary Examiner*—Muhammad Edun
(74) *Attorney, Agent, or Firm*—Dickstein Shapiro Morin & Oshinsky LLP

(57) ABSTRACT

An objective lens driving apparatus having a focusing coil and a tracking coil arranged in a parallel relationship with a thin, flat shape so that both the focusing coil and the tracking coil can be moved by a single flat magnet. An objective lens supporting member supports the objective lens, and is movably supported on a stationary member. A drive motor is provided at least one side of the objective lens supporting member. A yoke is fixed to the stationary member, and a drive magnet is mounted to the yoke. The drive magnet has a flat surface parallel to both the focusing direction and the tracking direction, the flat surface having four single-pole areas each of which is magnetized in a direction perpendicular to the flat surface. A drive coil assembly including the focusing coil and the tracking coil is mounted on the objective lens supporting member. The drive magnet assembly has a flat shape so that the drive coil assembly faces the flat surface of the drive magnet in parallel relationship with a small air gap therebetween.

15 Claims, 20 Drawing Sheets

FIG.9A
FIG.9B
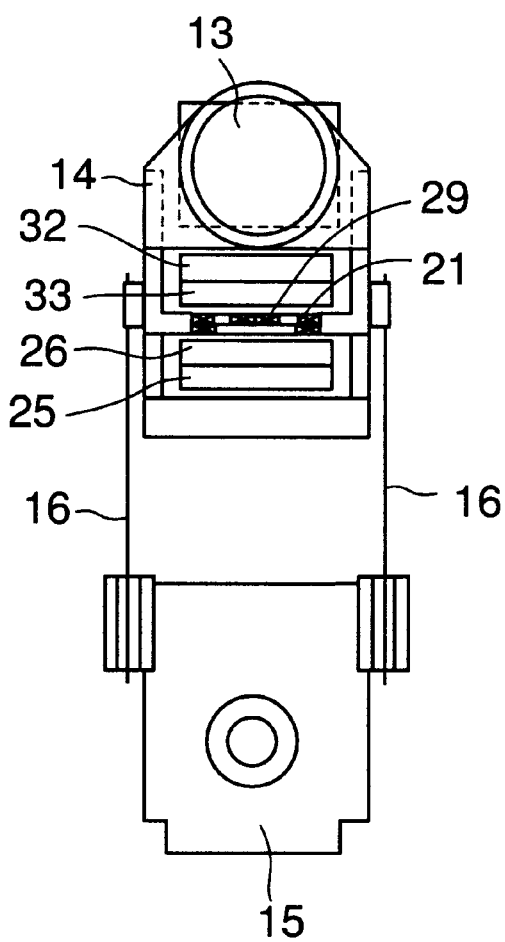
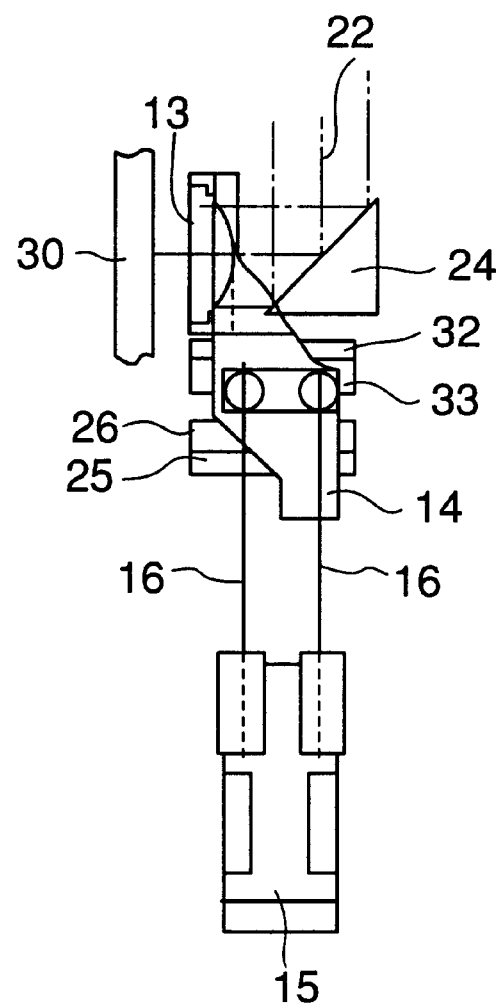

TRACKING

FOCUSING

FIG.21A
FIG.21B
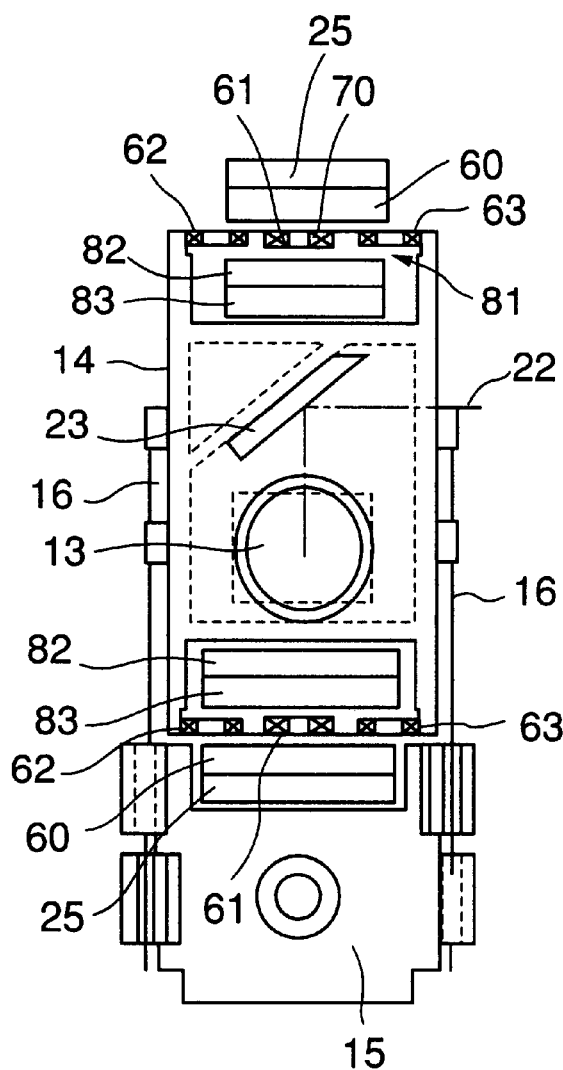
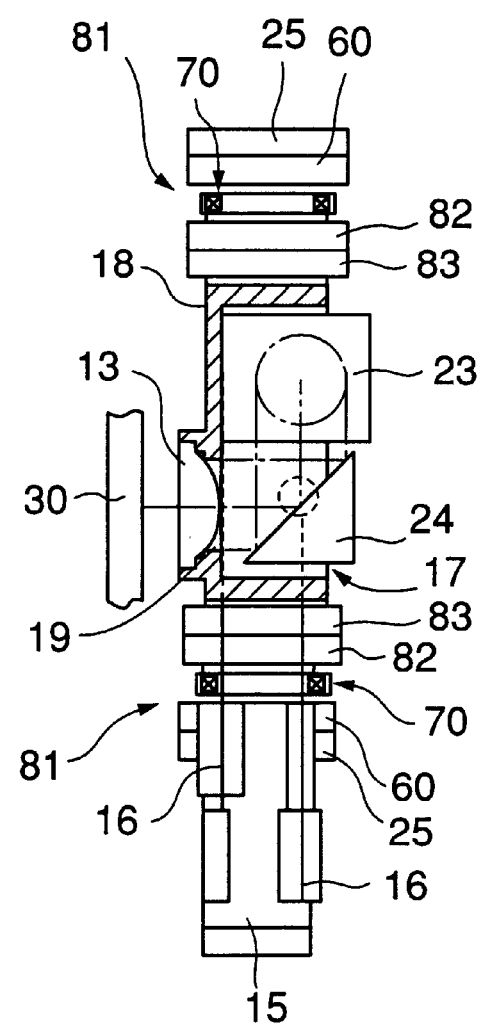

OBJECTIVE LENS DRIVING APPARATUS FOR DRIVING AN OBJECTIVE LENS OF AN OPTICAL DISK DRIVE

BACKGROUND OF THE INVENTION

1. Field of the Invention

The present invention generally relates to an objective lens driving apparatus of an optical disk drive and, more particularly, to an objective lens driving apparatus having an actuator for moving an objective lens in a focusing direction and a tracking direction.

2. Description of the Related Art

FIGS. 1A and 1B show a first example of a conventional objective lens driving apparatus. In the objective lens driving apparatus shown in FIGS. 1A and 1B, an objective lens 1 is supported by an objective lens supporting member 2 that is elastically supported by four wire springs 4 extending from a stationary member 3. A focusing coil 5 and a tracking coil 6, which are wound in directions perpendicular to each other, are provided around the objective lens supporting member 2. An end of each of the wire springs 4 is soldered to a base board 7 at a soldered portion 8a. The opposite end of each of the wire springs 4 is soldered to a respective one of the focusing coil 5 and the tracking coil 6 at a soldered portion 8b. Accordingly, the wire springs 4 serve as conductive wires to provide an electrical connection to the focusing coil 5 and the tracking coil 6. Magnets 10 are fixed to yokes 9 so that the objective lens supporting member 2 is interposed between the magnets 10. A light beam having an optical axis indicated by a chain line 12 is deflected by a prism 11, and enters the objective lens 1.

In the above-mentioned structure, the objective lens 1 is moved in a focusing direction indicated by an arrow Z and a tracking direction indicated by an arrow Y by moving the objective lens supporting member 2 by providing control currents to the focusing coil 5 and the tracking coil 6.

A description will now be given, with reference to FIG. 2, of a second example of the conventional objective lens driving apparatus. FIG. 2 is a perspective view of the second example of the conventional objective lens driving apparatus. In FIG. 2, parts that are the same as the parts shown in FIGS. 1A and 1B are given the same reference numerals, and descriptions thereof will be omitted.

In the objective lens driving apparatus shown in FIG. 2, each of the two magnets 10 is fixed to a respective one of yokes 9a. The focusing coil 5 and the tracking coil 6 are situated around the objective lens supporting member 2. An additional yoke 9b is provided near a respective one of the yokes 9a so that the focusing coil 5 and the tracking coil 6 are interposed between the yokes 9a and 9b. Accordingly, a closed magnetic circuit is formed by each of the magnets 10 and a respective pair of the yokes 9a and 9b. Thus, similar to the first example, the objective lens 1 is movable in a focusing direction indicated by an arrow Z and a tracking direction indicated by an arrow Y by moving the objective lens supporting member 2 by providing control currents to the focusing coil 5 and the tracking coil 6.

In the above-mentioned first and second examples of the conventional objective lens driving apparatus, the prism 11 must be situated under the objective lens supporting member 2 as shown in FIG. 1B since the focusing coil 5 and the tracking coil 6 are present. Thus, there is a problem in that a thickness of the entire apparatus is increased due to the arrangement of the prism 11.

Additionally, Japanese Laid-Open Patent Application No.9-180207 discloses a third example of the conventional objective lens driving apparatus. In this objective lens driving apparatus, a deflection mirror is provided inside the objective lens supporting member 2 so that the deflection mirror is movable together with the objective lens 1. Thereby, a light beam is prevented from being offset when the objective lens supporting member 2 is moved in the tracking direction.

It is considered to adopt a structure shown in FIG. 3 in which structure a driving motor having a closed magnetic circuit similar to the above-mentioned second example is applied to the structure disclosed in Japanese Laid-Open Patent Application No.9-180207. However, in such a case, there is a problem in that the objective lens supporting member 2 is tilted due to a torque generated by an offset between a center of driving force exerted on the focusing coil 5 and the center of gravity of a movable part including the focusing coil 5 as shown in FIG. 4.

Additionally, since the tracking force is generated by the tracking coil 6 in which a current flows in the focusing direction, there is a problem in that a sufficient drive force cannot be obtained.

Further, the above-mentioned Japanese Laid-Open Patent Application No.9-180207 discloses another embodiment in which an actuator for tracking is formed by a magnetic circuit different from a magnetic circuit of an actuator for focusing. Such a structure has a problem in that an assembling operation is complex and a manufacturing cost is increased.

SUMMARY OF THE INVENTION

It is a general object of the present invention to provide an improved and useful objective lens driving apparatus in which the above-mentioned problems are eliminated.

A more specific object of the present invention is to provide an objective lens driving apparatus in which a focusing coil and a tracking coil can be arranged in a parallel relationship with a thin, flat shape so that both the focusing coil and the tracking coil can be moved by a single flat magnet.

Another object of the present invention is to provide an objective lens driving apparatus in which a movable part including a focusing coil is prevented from being tilted.

A further object of the present invention is to provide an objective lens driving apparatus in which drive forces generated by a focusing coil and a tracking coil are increased by forming a closed magnetic circuit.

In order to achieve the above-mentioned objects, there is provided according to the present invention an objective lens driving apparatus for moving an objective lens in a focussing direction and a tracking direction relative to an optical disk, the objective lens driving apparatus comprising:

an objective lens supporting member supporting the objective lens, the objective lens supporting member being movably supported on a stationary member; and a drive motor provided at least one side of the objective lens supporting member, the drive motor comprising:

a yoke fixed to the stationary member;

a drive magnet mounted to the yoke and having a flat surface parallel to both the focusing direction and the tracking direction, the flat surface having four single-pole areas each of which is magnetized in a direction perpendicular to the flat surface; and a drive coil assembly mounted on the objective lens supporting member and including a focusing coil and a tracking coil, the drive coil assembly having a flat shape so that the drive coil assembly faces the flat surface of the drive magnet in parallel relationship with a small air gap therebetween.

According to the above-mentioned invention, the drive motor is formed by the combination of the drive magnet having a surface divided into four magnetization areas and the drive coil assembly having a flat shape. The drive magnet generates magnetic fields in different directions in the vicinity of the flat surface. Accordingly, both the focusing coil and the tracking coil can be positioned in the vicinity of the drive magnet and parallel to the flat surface so that both the focusing coil and the tracking coil generate a drive force by being subjected to the magnetic fields in the vicinity of the drive magnet. Thus, the drive motor can be formed in a flat shape. Since the focusing coil does not surround the objective lens supporting member, a light beam can be introduced into an optical system provided within the objective lens supporting member in the tracking direction. Additionally, the entire focusing coil can be subjected to the magnetic field generated by the drive magnet, a focusing force is generated uniformly in the entire focusing coil. Thereby, it can be assumed that the focusing force is exerted on the center of gravity of the focusing coil. Thus, the objective lens supporting member to which the focusing coil is mounted is prevented from being tilted due to an offset between the center of gravity of the focusing coil and the center of the area which receives the focusing force.

In the objective lens driving apparatus according to the present invention, the drive motor may further comprise an additional yoke fixed to the stationary member and an additional drive magnet mounted to the additional yoke, the additional drive magnet having the same magnetization structure as the drive magnet, the additional drive magnet being positioned adjacent to the drive magnet so that the drive coil assembly is interposed therebetween and a closed magnetic circuit is formed by a combination of the yoke, the drive magnet, the additional drive magnet and the additional yoke.

According to this invention, the drive coil assembly is interposed between the two drive magnets that are mounted on the respective yokes. That is, the drive coil assembly is positioned in a closed magnetic circuit. In such a closed magnetic circuit, a high, uniform magnetic flux density can be obtained. Thus, the drive motor can effectively generate both a focusing force and a tracking force.

According to one embodiment of the present invention, the single-pole areas of the drive magnet are defined by a first line extending in a focusing direction and a second line perpendicular to the first line and extending in the tracking direction, each of the single-pole areas is magnetized in a direction opposite to a direction of magnetization of adjacent ones of the single-pole magnets;

the focusing coil including a first focusing coil and a second focusing coil, the first focusing coil being positioned on one side of the first line and extending over the second line, the second focusing coil being positioned on the other side of the first line and extending over the second line; and the tracking coil including a first tracking coil and a second tracking coil, the first tracking coil being positioned on one side of the second line and extending over the first line, the second tracking coil being positioned on the other side of the second line and extending over the first line.

Additionally, according to another embodiment of the present invention, the single-pole areas of the drive magnet includes a first single-pole area, a second single-pole area, a third single pole area and a fourth single pole area defined by a first line extending in the focusing direction and a second line extending in the tracking direction, the first and second single-pole areas being positioned on one side of the first line and the third and fourth single-pole areas being positioned on the other side of the first line, the first and fourth single-pole areas being positioned on one side of the second line and the second and third single-pole areas being positioned on the other side of the second line, each of the single-pole areas being magnetized in a direction opposite to a direction of magnetization of adjacent ones of the single-pole areas;

the focusing coil includes a first focusing coil and a second focusing coil, the first focusing coil being positioned on one side of the first line and extending over the second line so that a half portion overlaps the first single-pole area and the other half portion overlaps the second single-pole area, the second focusing coil being positioned on the other side of the first line and extending over the second line so that a half portion overlaps the third single-pole area and the other half portion overlaps the fourth single-pole area; and the tracking coil includes a first tracking coil, a second tracking coil and four third tracking coils, the first tracking coil being positioned on one side of the second line and extending over the first line so that a half portion overlaps the first single-pole area and the other half portion overlaps the fourth single-pole area, the second tracking coil being positioned on the other side of the second line and extending over the first line so that a half portion overlaps the second single-pole area and the other half portion overlaps the third single-pole area, a first one of the third tracking coils being positioned on one side of the first tracking coil so that at most a half portion of the first one of the third tracking coils overlaps the first single-pole area, a fourth one of the third tracking coils being positioned on the other side of the first tracking coil so that at most a half portion of the second one of the third tracking coils overlaps the fourth single-pole area, a second one of the third tracking coils being positioned on one side of the second tracking coil so that at most a half portion of the second one of the third tracking coils overlaps the second single-pole area, a third one of the third tracking coils being positioned on the other side of the second tracking coil so that at most a half portion of the third one of the third tracking coils overlaps the third single-pole area.

Further, according to one embodiment of the present invention, the single-pole areas of the drive magnet includes a first single-pole area, a second single-pole area, a third single pole area and a fourth single pole area that are defined by a first line extending in the focusing direction, a second line parallel to the first line and a third line extending in the tracking direction between the first line and the second line, the first single-pole area being positioned on one side of the third line and between the first line and the second line, the second single-pole area being positioned on the other side of the third line between the first line and the second line, the third single-pole area being positioned on a side of the first line which side is opposite to a side on which the first and second single-pole areas are positioned, the fourth single-pole area being positioned on a side of the second line which side is opposite to a side on which the first and second single-pole areas are positioned, the first single-pole area being magnetized in a direction opposite to a direction of magnetization of the second single-pole area;

the focusing coil is positioned between the first line and the second line and extends over the third line so that a half portion overlaps the first single-pole area and the other half portion overlaps the second single-pole area; and the tracking coil includes a first tracking coil and a second tracking coil, the first tracking coil being positioned on one side of the focusing coil so that at most a half portion overlaps the third single-pole area, the second tracking coil being positioned on the other side of the focusing coil so that at most a half portion overlaps the fourth single-pole area.

Other objects, features and advantages of the present invention will become more apparent from the following detailed description when read in conjunction with the accompanied drawings.

BRIEF DESCRIPTION OF THE DRAWINGS

FIG. 9A is a plan view of an objective lens driving apparatus according to a third embodiment of the present invention; FIG. 9B is a side view of the objective lens driving apparatus shown in FIG. 9A;

FIG. 21A is a plan view of an objective lens driving apparatus according to an eighth embodiment of the present invention; FIG. 21B is a side view of the objective lens driving apparatus shown in FIG. 21A;

DETAILED DESCRIPTION OF THE PREFERRED EMBODIMENTS

Figure 1A:
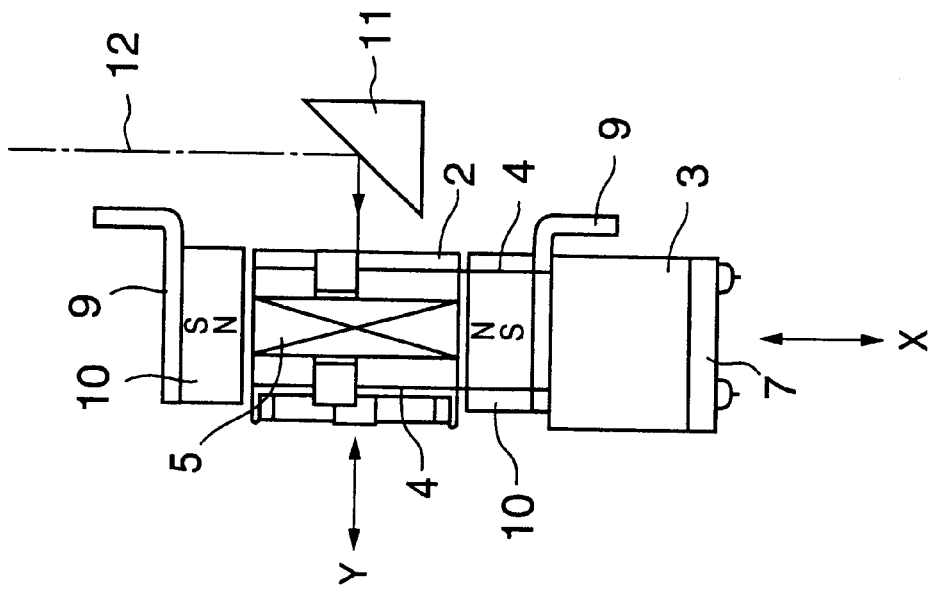
FIG. 1A is a plan view of a first example of a conventional objective lens driving apparatus.
Figure 1B:
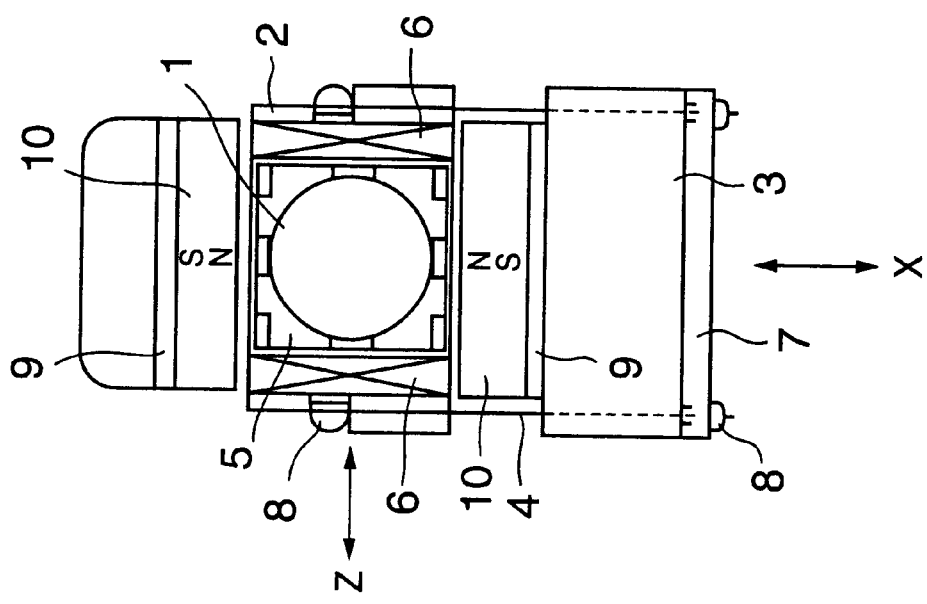
FIG. 1B is a side view of the first example of the conventional objective lens driving apparatus.
Figure 2:
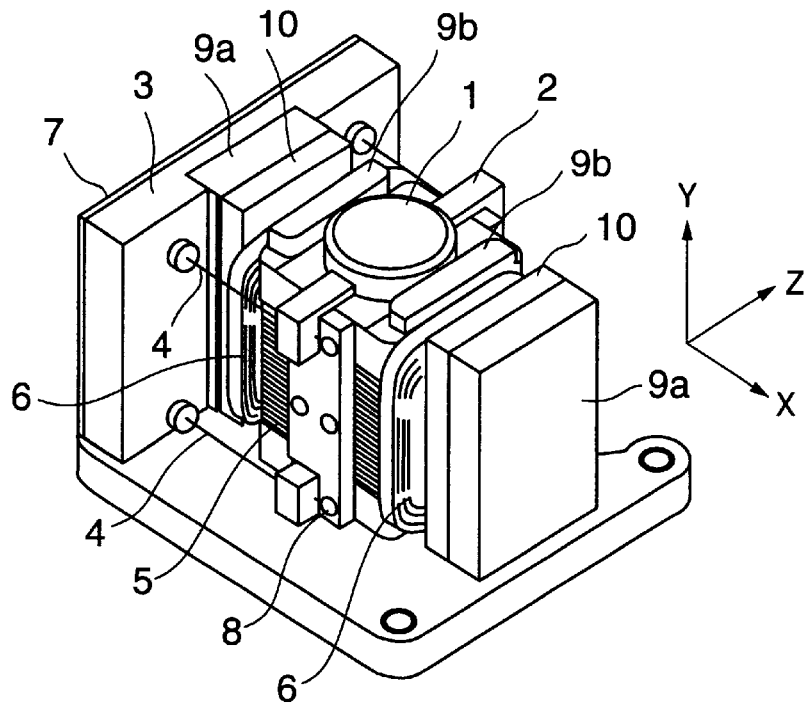
FIG. 2 is a perspective view of a second example of the conventional objective lens driving apparatus.
Figure 3:
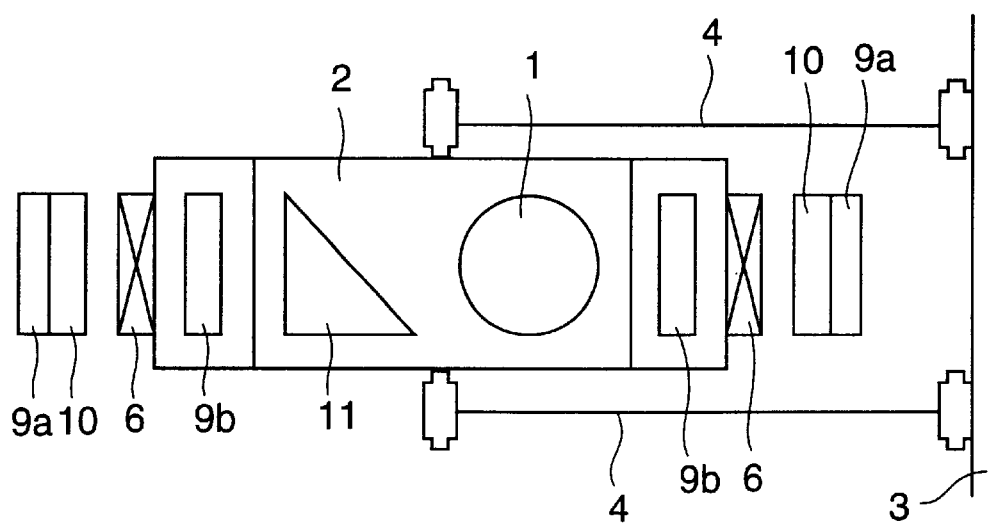
FIG. 3 is an illustration of an objective lens driving apparatus provided with a deflection mirror inside a movable part.
Figure 4:
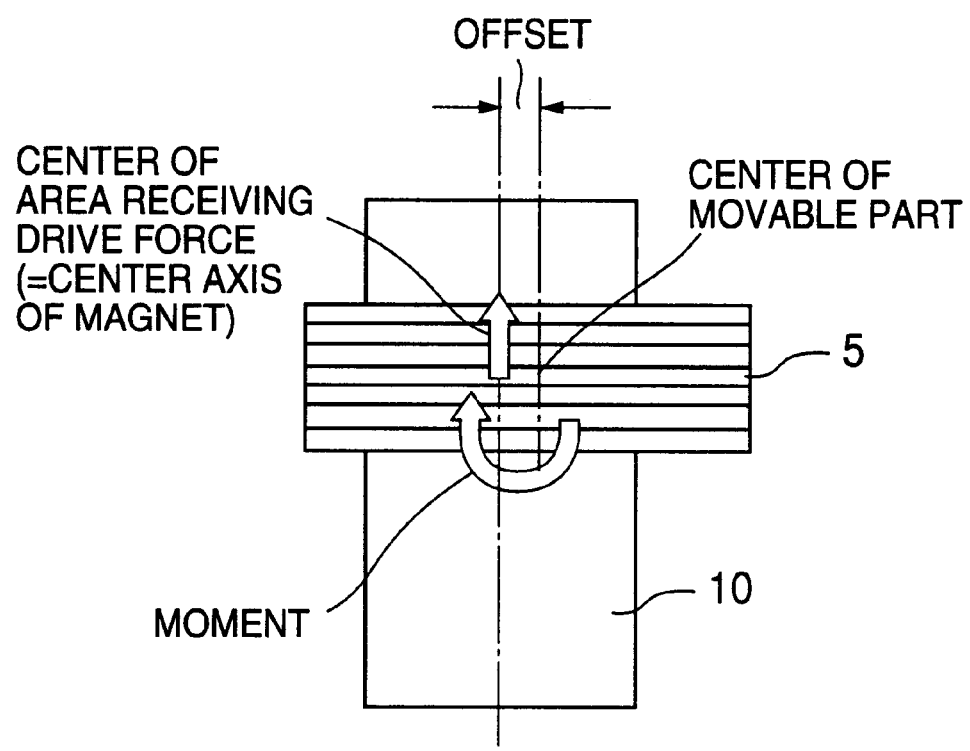
FIG. 4 is an illustration showing a positional relationship between a drive magnet and a focusing coil in the conventional objective lens driving apparatus.
Figure 5A:
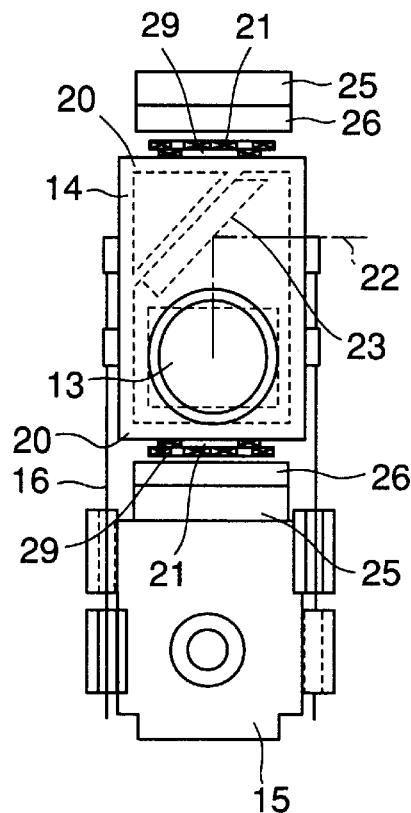
FIG. 5A is a plan view of an objective lens driving apparatus according to a first embodiment of the present invention.
Figure 5B:
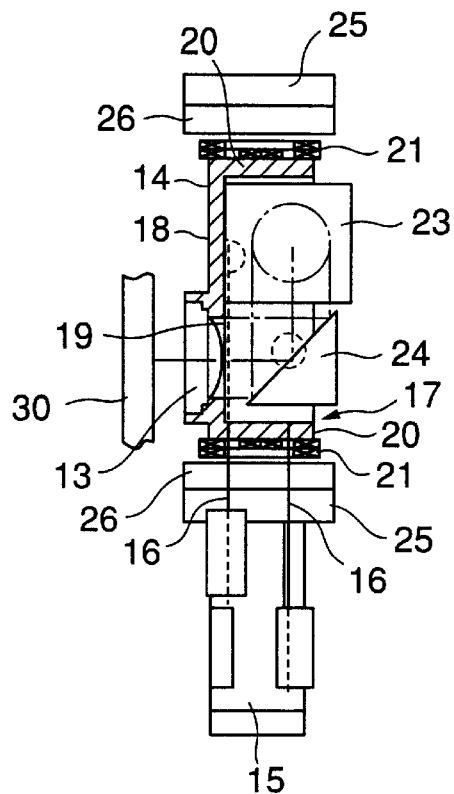
FIG. 5B is a side view of the objective lens driving apparatus shown in FIG. 5A.
Figure 6:
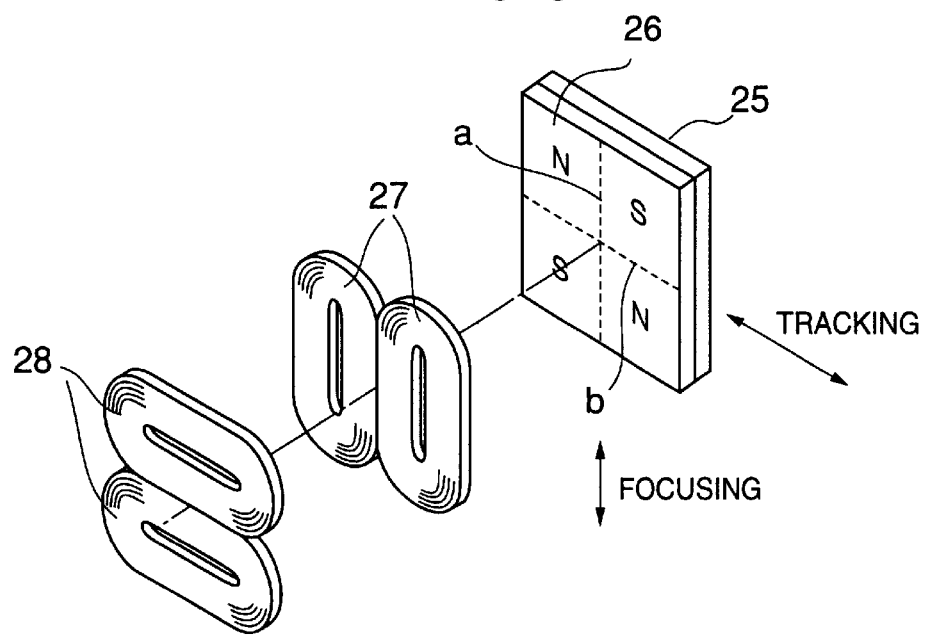
FIG. 6 is an illustration for explaining a relationship between a magnet, a focusing coil and a tracking coil provided in the objective lens driving apparatus shown in FIGS. 5A and 5B.

A description will now be given, with reference to FIGS. 5A, 5B and 6, of an objective lens driving apparatus according to a first embodiment of the present invention. FIG. 5A is a plan view of the objective lens driving apparatus according to the first embodiment of the present invention. FIG. 5B is a side view of the objective lens driving apparatus shown in FIG. 5A. FIG. 6 is an illustration for explaining a relationship between a magnet, a focusing coil and a tracking coil provided in the objective lens driving apparatus shown in FIGS. 5A and 5B.

In the objective lens driving apparatus according to the first embodiment of the present invention, an objective lens 13 is supported by an objective lens supporting member 14 that is elastically supported by four wire springs 16 extending from a stem 15. The objective lens supporting member 14 has a generally box-like shape so that an inner apace 17 is formed. The objective lens 13 is mounted on a bottom wall 18 of the objective lens supporting member 14. An opening 19 is formed on the bottom wall 18 so that a light beam enters the objective lens 13 by passing through the opening 19. The objective lens supporting member 14 has side walls 20 on opposite sides in an extending direction of the wire springs 16. Each of the side walls 20 serves as a base boards to which a drive coil assembly 21 is mounted. A structure of the drive coil assembly 21 will be described later.

A notch (not shown in the figure) is formed on one of the side walls of the objective lens supporting member 14 so as to pass a light beam having an optical axis 22. A movable deflection mirror 23 is provided within the inner space 17 so that the deflection mirror 23 deflects the light beam toward a deflection prism 24 which is also provided within the inner space 17. The light beam is deflected by the deflection prism 24 and incident on the objective lens 13. It should be noted that one of the wire springs 16, which one is located on the side of the side wall provided with the notch and remote from the objective lens 13, is offset in an extending direction of the spring wires 16 so that the one of the wire springs 16 does not interfere with the light beam passing through the notch.

A yoke (magnetic material) 25 and a drive magnet 26 are provided on each side of the side walls 20 so that the drive magnet 26 faces the drive coil assembly 21 with a small air gap therebetween. The drive magnet 26 is magnetized so that a surface of the drive magnet 26 is divided into four single-pole areas by magnetization boundary lines "a" and "b" as shown in FIG. 6. Directions of magnetization of the drive magnet 26 are perpendicular to each of a focusing direction and a tracking direction so that the direction of magnetization of each of the four single-pole areas is opposite to adjacent ones of the single-pole areas.

As mentioned above, the drive coil assembly 21 is mounted to the objective lens supporting member 14. The drive coil assembly 21 comprises two focussing coils 27 and two tracking coils 28. One of the focusing coils 27 is provided on one side of the magnetization boundary line "a" and the other is provided on the opposite side of the magnetization boundary line "a". Accordingly, each of the focusing coils 27 extends over the magnetization boundary line "b". On the other hand, one of the tracking coils 28 is provided on one side of the magnetization boundary line "b" and the other is provided on the opposite side of the magnetization boundary line "b". Accordingly, each of the tracking coils 28 extends over the magnetization boundary line "a". A drive motor (actuator) 29 is formed by the focussing coils 27, the tracking coils 28 and the drive magnet 26. It should be noted that an optical recording medium 30 such as an optical disk is located near the objective lens 13.

In the above-mentioned structure, a drive force is generated by providing a current to the focusing coils 27 and/or the tracking coils 18 due to magnetic fields generated by the drive magnet 26. Accordingly, the objective lens supporting member 14 including the objective lens 13 is movable in the focusing direction and/or the tracking direction.

Additionally, if currents are separately provided to each of the focusing coils 27, the objective lens 13 can be tilted with respect to a recording surface of the optical recording medium 30 so as to adjust an incident angle of the light beam on the optical recording medium 30. Further, if currents are individually provided to each of the tracking coils 28, the objective lens 13 can be tilted with respect to a recording surface of the optical recording medium 30 so as to adjust an incident angle of the light beam on the optical recording medium 30. In such a case, additional lead wires must be connected to the focusing coils 27 or the tracking coils 28 so as to achieve electrical connection. Thus, a number of wire springs 16, which serve as lead wires for electrical connection, may be increased, or each of the wire springs 16 may be formed by a plurality of core wires.

In the above-mentioned structure, the movable deflection mirror 23 and the deflection prism 24 are provided within the inner space 17. Thereby, a thickness and a size of the entire apparatus can be reduced even if the focusing coils 27 and the tracking coils 28 occupy relatively large areas.

Figure 7A:
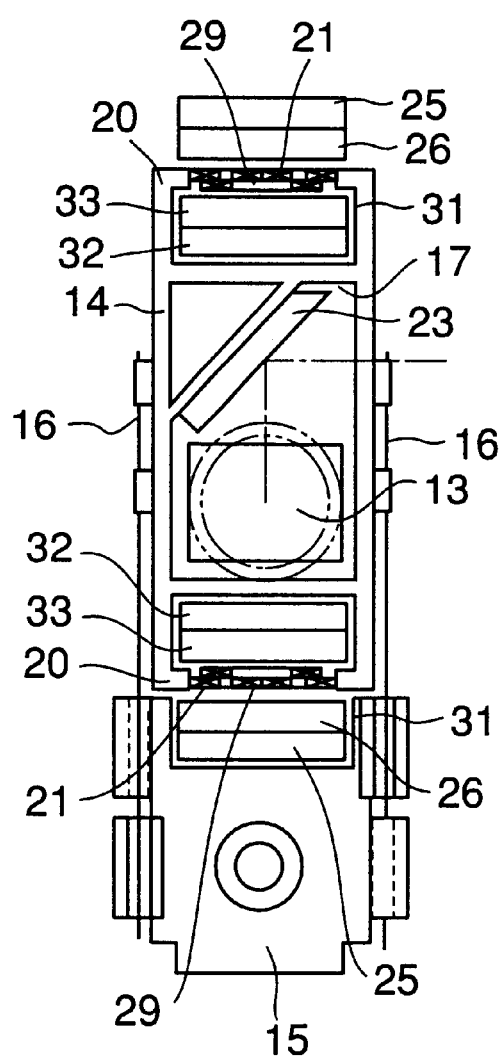
FIG. 7A is a plan view of an objective lens driving apparatus according to a second embodiment of the present invention.
Figure 7B:
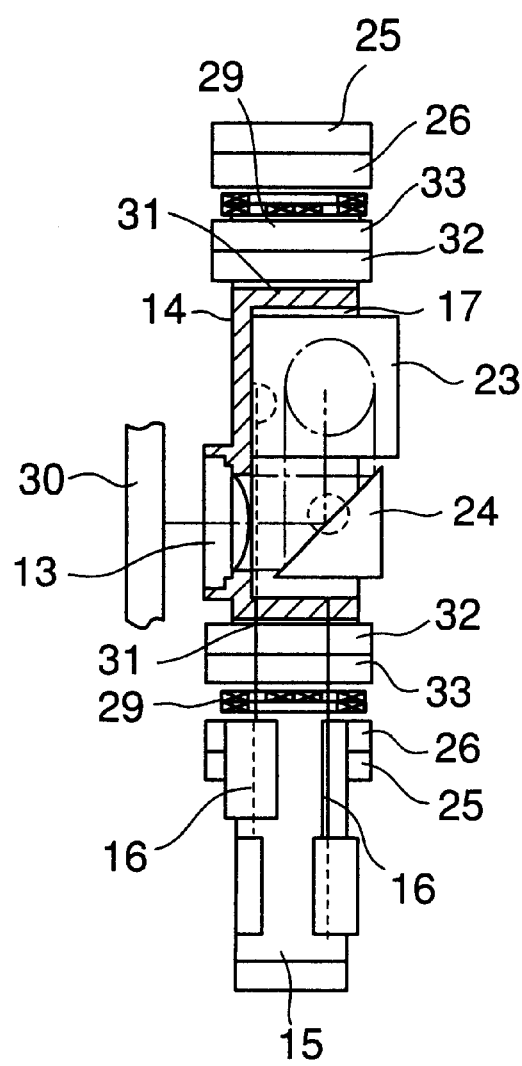
FIG. 7B is a side view of the objective lens driving apparatus shown in FIG. 7A.
Figure 8:
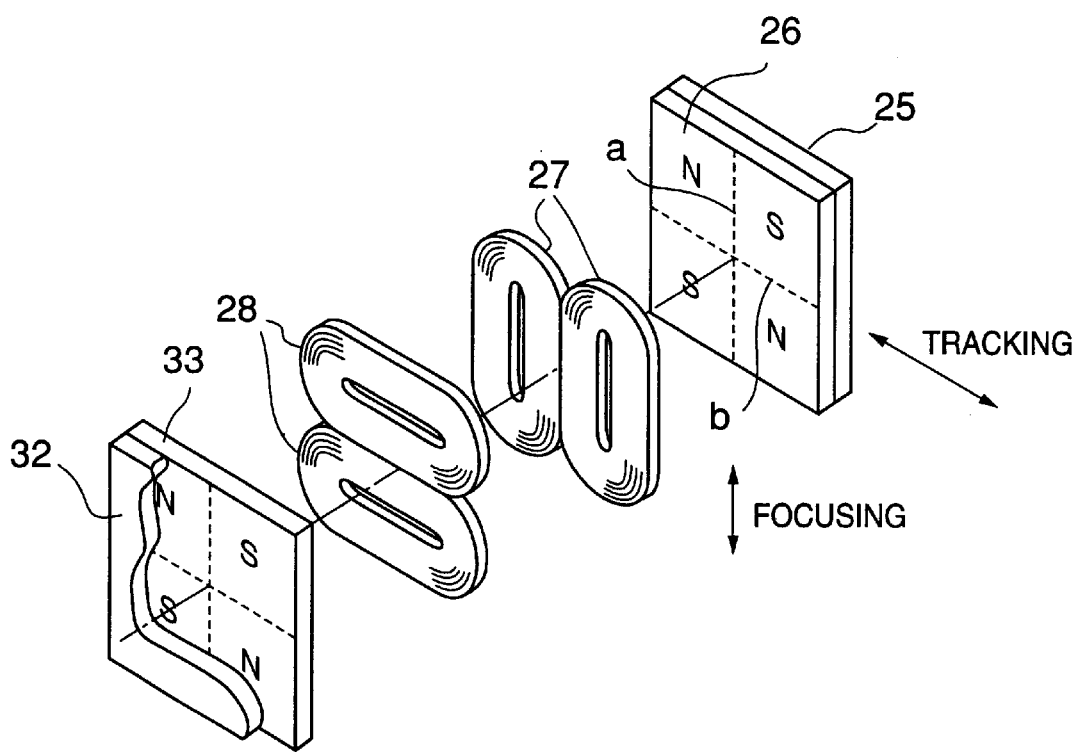
FIG. 8 is an illustration for explaining a relationship between a magnet, a focusing coil and a tracking coil provided in the objective lens driving apparatus shown in FIGS. 7A and 7B.

A description will now be given, with reference to FIGS. 7A, 7B and 8, of an objective lens driving apparatus according to a second embodiment of the present invention. FIG. 7A is a plan view of the objective lens driving apparatus according to the second embodiment of the present invention. FIG. 7B is a side view of the objective lens driving apparatus shown in FIG. 7A. FIG. 8 is an illustration for explaining a relationship between a magnet, a focusing coil and a tracking coil provided in the objective lens driving apparatus shown in FIGS. 7A and 7B. In FIGS. 7A, 7B and 8, parts that are the same as the parts shown in FIGS. 5A, 5B and 6 are given the same reference numerals, and descriptions thereof will be omitted.

In the present embodiment, the objective lens supporting member 14 is enlarged so as to form a space 31 on each side of the inner space 17. That is, an additional wall is formed inside each of the side walls 20. The drive coil assembly 21 is embedded in each of the side walls 20. The drive magnet 26 mounted on the yoke 25 is provided so as to face the drive coil assembly 21. An additional yoke 32 and an additional drive magnet 33 are situated in each of the spaces 31.

As shown in FIG. 8, each of the drive magnet 26 and the drive magnet 33 is magnetized so that a surface of the drive magnet 22 is divided into four single-pole areas by magnetization boundary lines "a" and "b". Directions of magnetization of each of the drive magnets 26 and 33 are perpendicular to each of the focusing direction and the tracking direction so that the direction of magnetization of each of the four single-pole areas is opposite to adjacent ones of the four single-pole areas.

As mentioned above, the drive coil assembly 21 is mounted to the objective lens supporting member 14. The drive coil assembly 21 comprises two focussing coils 27 and two tracking coils 28. One of the focusing coils 27 is provided on one side of the magnetization boundary line "a" and the other is provided on the opposite side of the magnetization boundary line "a". Accordingly, each of the focusing coils 27 extends over the magnetization boundary line "b". On the other hand, one of the tracking coils 28 is provided on one side of the magnetization boundary line "b" and the other is provided on the opposite side of the magnetization boundary line "b". Accordingly, each of the tracking coils 28 extends over the magnetization boundary line "a". A drive motor (actuator) 29 is formed by the focussing coils 27, the tracking coils 28, the drive magnet 26 and the drive magnet 33.

In the above-mentioned structure, a closed magnetic circuit is formed by the yoke 25, the drive magnet 26, the additional yoke 32 and the additional drive magnet 33. Thereby, a magnetic flux density can be increased, and distribution of the magnetic flux density can be uniform. It should be noted that one of the drive magnets 26 and 33 may be omitted so that magnetic fields are formed sorely by the remaining one of the drive magnets 26 and 33.

A description will now be given, with reference to FIGS. 9A and 9B, of an objective lens driving apparatus according to a third embodiment of the present invention. FIG. 9A is a plan view of the objective lens driving apparatus according to the third embodiment of the present invention. FIG. 9B is a side view of the objective lens driving apparatus shown in FIG. 9A. In FIGS. 9A and 9B, parts that are the same as the parts shown in FIGS. 7A, 7B and 8 are given the same reference numerals, and descriptions thereof will be omitted.

The objective lens drive apparatus according to the present embodiment is capable of being subjected to a high acceleration by providing the drive motor on one side of the objective lens supporting member 14 according to the above-mentioned second embodiment. That is, the drive motor 29 located on the free end side of the objective lens supporting member 14 is omitted. Specifically, a part of the objective lens supporting member 14, which part is positioned beyond the objective lens 13, is removed. Accordingly, an end of the objective lens supporting member 14 is open. Thereby, the optical axis 22 of the light beam extends from the end of the objective lens supporting apparatus 14 to the deflection prism 24. Thus, there is no need to provide the deflection mirror 23 in this embodiment. Additionally, one of the wire springs 16 is not required to be offset in the extending direction of the wire springs 16.

Figure 10A:
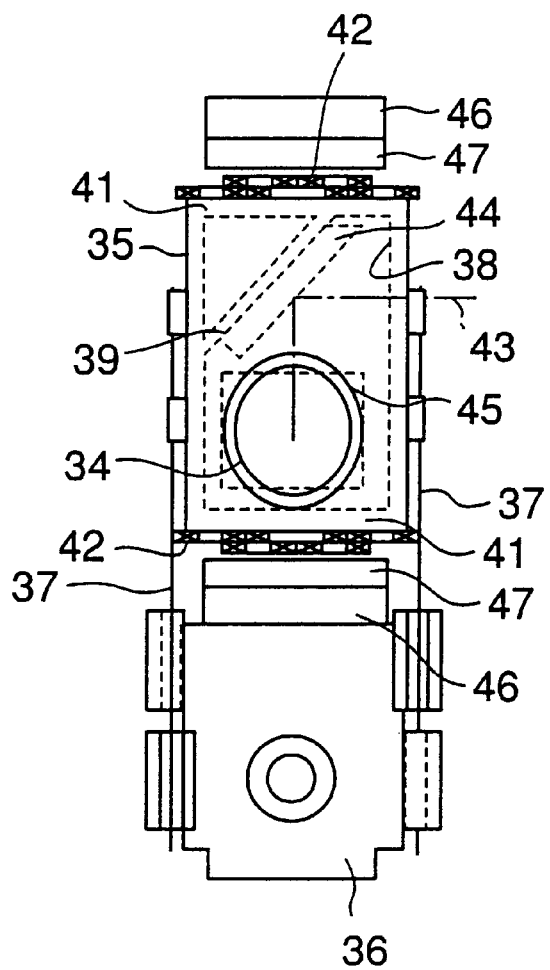
FIG. 10A is a plan view of an objective lens driving apparatus according to a fourth embodiment of the present invention.
Figure 10B:
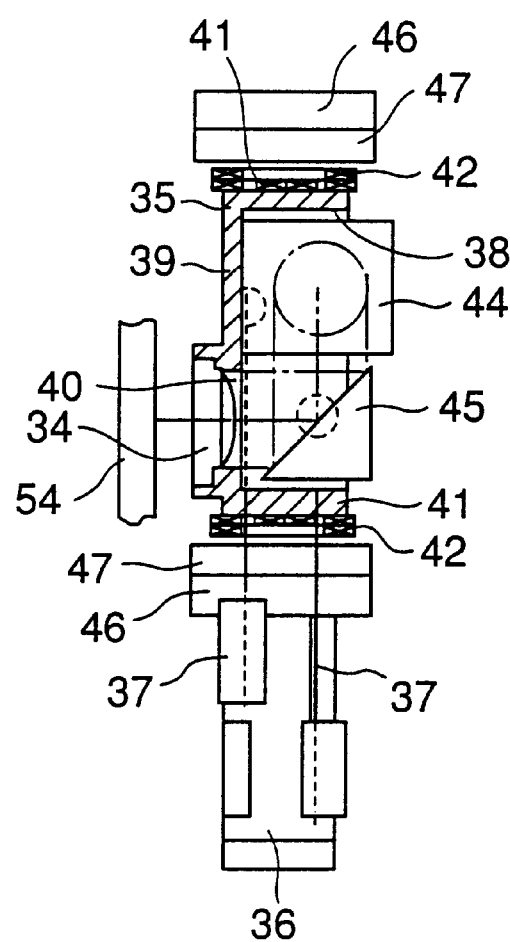
FIG. 10B is a side view of the objective lens driving apparatus shown in FIG. 10A.
Figure 11:
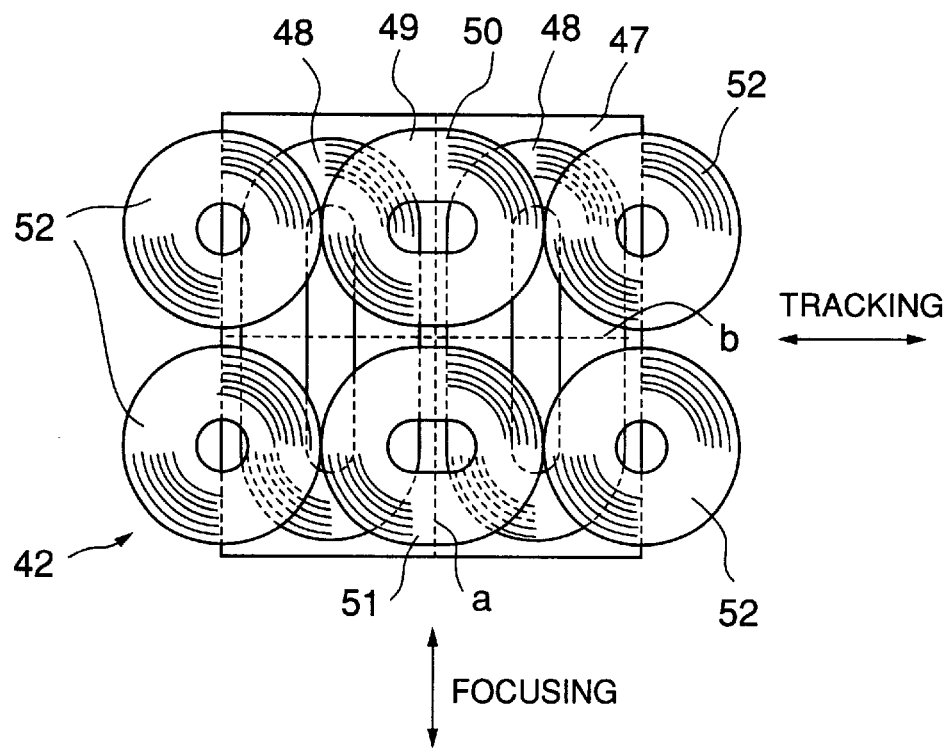
FIG. 11 is an illustration for explaining a relationship between a magnet, a focusing coil and a tracking coil provided in the objective lens driving apparatus shown in FIGS. 10A and 10B.
Figure 12:
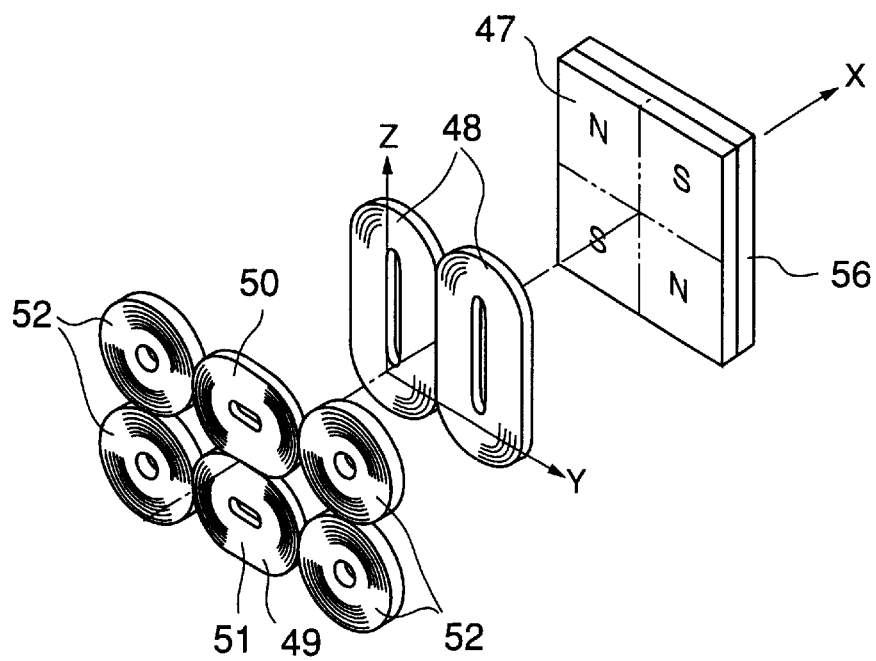
FIG. 12 is an illustration for explaining a relationship between a magnet, a focusing coil and a tracking coil provided in the objective lens driving apparatus shown in FIGS. 10A and 10B.

A description will now be given, with reference to FIGS. 10A, 10B, 11 and 12, of an objective lens driving apparatus according to a fourth embodiment of the present invention. FIG. 10A is a plan view of the objective lens driving apparatus according to the fourth embodiment of the present invention. FIG. 10B is a side view of the objective lens driving apparatus shown in FIG. 10A. FIG. 11 is an illustration for explaining a relationship between a magnet, a focusing coil and a tracking coil provided in the objective lens driving apparatus shown in FIGS. 10A and 10B. FIG. 12 is an illustration for explaining a relationship between a magnet, a focusing coil and a tracking coil provided in the objective lens driving apparatus shown in FIGS. 10A and 10B.

In the objective lens driving apparatus according to the fourth embodiment of the present invention, an objective lens 34 is supported by an objective lens supporting member 35 that is elastically supported by four wire springs 37 extending from a stem 36. The objective lens supporting member 35 has a generally box-like shape so that an inner apace 38 is formed. The objective lens 34 is mounted on a bottom wall 39 of the objective lens supporting member 35. An opening 40 is formed on the bottom wall 39 so that a light beam enters the objective lens 4 by passing through the opening 40. The objective lens supporting member 35 has side walls 41 on opposite sides in an extending direction of the wire springs 37. Each of the side walls 41 serves as a base boards to which a drive coil assembly 42 is mounted. A structure of the drive coil assembly 42 will be described later.

A notch (not shown in the figure) is formed on one of the side walls of the objective lens supporting member 35 so as to pass a light beam having an optical axis 43. A movable deflection mirror 44 is provided within the inner space so that the deflection mirror 44 deflects the light beam toward a deflection prism 45 also provided within the inner space 38. The light beam is deflected by the deflection prism 45 and incident on the objective lens 34. It should be noted that one of the wire springs 37, which one is located on the side of the side wall provided with the notch and remote from the objective lens 43, is offset in an extending direction of the spring wires 37 so that the one of the wire springs 37 does not interfere with the light beam passing through the notch.

A yoke (magnetic material) 46 and a drive magnet 47 are provided on each side of the side walls 41 so that the drive magnet 47 faces the drive coil assembly 42 with a small air gap therebetween. The drive magnet 47 is magnetized so that a surface of the drive magnet 47 is divided into four single-pole areas by magnetization boundary lines "a" and "b" as shown in FIG. 11. Directions of magnetization of the drive magnet 47 are perpendicular to each of a focusing direction and a tracking direction so that the direction of magnetization of each of the four single-pole areas is opposite to that of the adjacent ones of the four single-pole areas.

As mentioned above, the drive coil assembly 42 is mounted to the objective lens supporting member 35. The drive coil assembly 42 comprises two focussing coils 48 and a tracking coil assembly 49. One of the focusing coils 48 is provided on one side of the magnetization boundary line "a" and the other is provided on the opposite side of the magnetization boundary line "a". Accordingly, each of the focusing coils 48 extends over the magnetization boundary line "b". The tracking coil assembly 49 comprises a first tracking coil 50, a second tracking coil 51 and four third tracking coils 52. The first tracking coil 50 is provided on one side of the magnetization boundary line "b" and the second tracking coil 51 is provided on the opposite side of the magnetization boundary line "b". Accordingly, each of the first tracking coil 50 and the second tracking coil 51 extends over the magnetization boundary line "a".

Two of the third tracking coils 52 are arranged on one side of the first and second tracking coils 50 and 51 in the tracking direction, and the other two are arranged on the other side of the first and second tracking coils 50 and 51 in the tracking direction. A half of each of the two third tracking coils 52 arranged on one side of the first and second tracking coils 50 and 51 does not overlap the drive magnet 47. This is because if the entire third tracing coil 52 overlaps the same magnetized part of the drive magnet 47, a driving force generated by a half portion of the third magnetic coil 52 is canceled by a driving force generated by the other half portion of the same third magnetic coil 52. Similarly, a half of each of the two third tracking coils 52 arranged on the other side of the first and second tracking coils 50 and 51 does not overlap the drive magnet 47 so that a drive force generated by a current flowing through the third tracking coils 52 is not canceled.

A drive motor (actuator) 53 is formed by the focussing coils 48, the tracking coils assembly 49 and the drive magnet 47. It should be noted that an optical recording medium 54 such as an optical disk is located near the objective lens 34.

In the above-mentioned structure, a drive force is generated by providing a current to the focusing coils 48 and/or the tracking coil assembly 49 due to magnetic fields generated by the drive magnet 47. Accordingly, the objective lens supporting member 35 including the objective lens 34 is movable in the focusing direction and/or the tracking direction.

Additionally, if currents are individually provided to each of the focusing coils 48, the objective lens 13 can be tilted with respect to a recording surface of the optical recording medium 54 so as to adjust an incident angle of the light beam on the optical recording medium 30. Further, if currents are individually provided to each of the first to third tracking coils 52, the objective lens 34 can be tilted with respect to a recording surface of the optical recording medium 54 so as to adjust an incident angle of the light beam on the optical recording medium 54. In such a case, additional lead wires must be connected to the focusing coils 48 or the tracking coil assembly 49 so as to achieve electrical connection. Thus, a number of wire springs 37, which serve as lead wires for electrical connection, may be increased, or each of the wire springs 37 may be formed by a plurality of core wires.

In the above-mentioned structure, the movable deflection mirror 44 and the deflection prism 45 are provided within the inner space 38. Thereby, a thickness and a size of the entire apparatus can be reduced even if the focusing coils 48 and the tracking coil assembly 49 occupy relatively large areas.

According to the above-mentioned structure of the tracking coil assembly 49 comprising the first and second tracking coils 50 and 51 and the third tracking coils 52, a large drive force can be generated in the tracking direction even if a direction of a current flowing in the tracking coil assembly 49 is the focusing direction. That is, considering a single pole part of the drive magnet 47 which is formed as a quadrupole magnet, in order to generate a large tracking force, it is desirable to increase an area of each of the tracking coils, through which area a current flows in the focusing direction. In the present embodiment, in order to achieve such an increase in an area through which a current flows in the focusing direction, the third tracking coils 52 are added to the first and second tracking coils 50 and 51. Accordingly, an area effective to generate a tracking force can be increased by using the same size drive magnet. In this structure, portions of the third tracking coils 52, which portions do not overlap the drive magnet 47, protrude from the drive magnet 47 in the tracking direction. However, a space around the objective lens driving apparatus is usually an open space, and there is no influence to the size of the entire apparatus.

It should be noted that the focusing coils 48 and the tracking coil assembly 49 are fixed to the side wall 41 of the objective lens supporting member 35 by a layered structure. Accordingly, these coils can be accurately positioned even if a number of coils to be used is large, which can improve an assembling operation.

Figure 13:
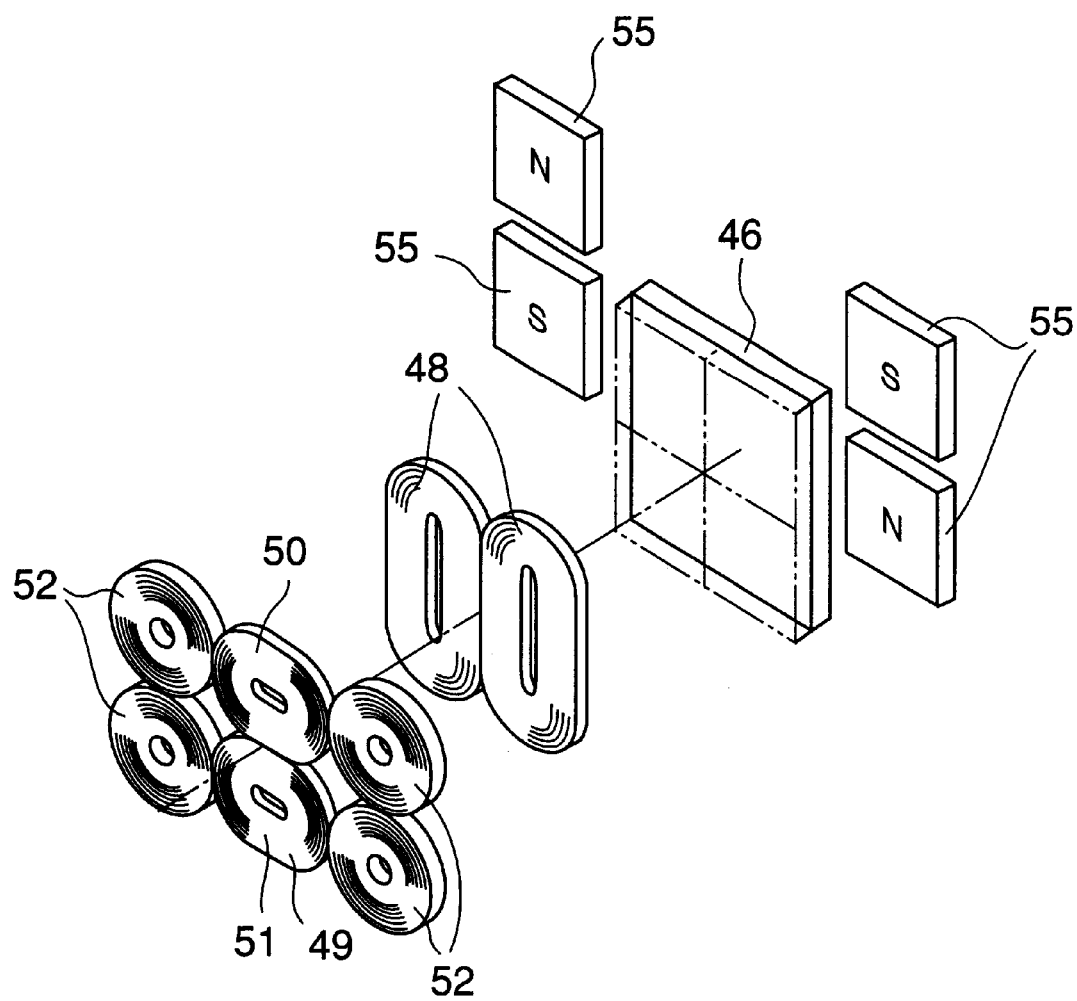
FIG. 13 is a perspective view of a variation of a drive motor provided in the objective lens driving apparatus shown in FIGS. 10A and 10B.
Figure 14:
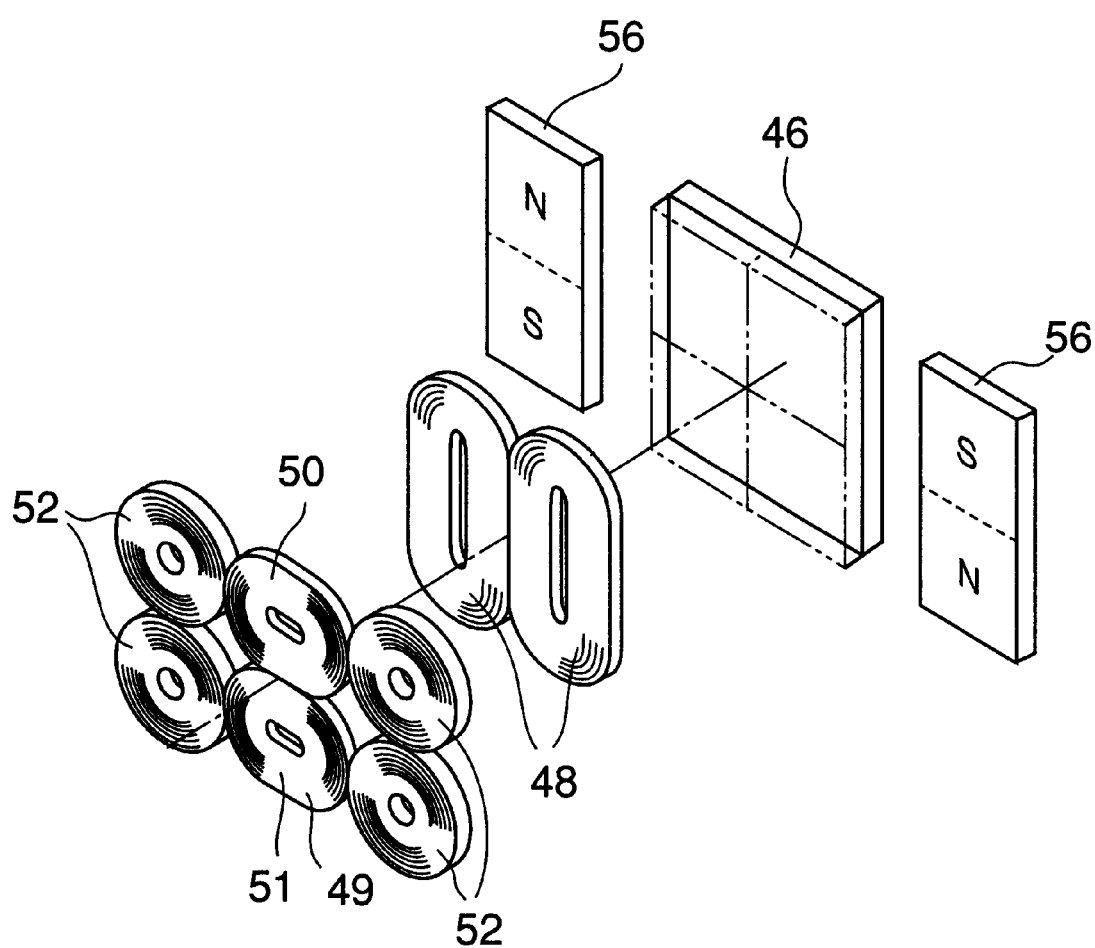
FIG. 14 is a perspective view of another variation of the drive motor provided in the objective lens driving apparatus shown in FIGS. 10A and 10B.

In the above-mentioned embodiment, the drive magnet 47 is formed of a single magnetic member which is magnetized in a quadrupole structure. However, the drive magnet 47 may be formed by combining four single-pole magnets 55 as shown in FIG. 13 or two double-pole magnets 56 as shown in FIG. 14. This structure of the drive magnet 47 facilitates production of the quadrupole drive magnet. Additionally, clear separation of poles in the drive magnet 47 can be achieved by combining the single-pole magnets.

It should be noted that the above-mentioned structure of the drive magnet 47 can be applied to the drive magnet provided in other embodiments according to the present invention.

Figure 15A:
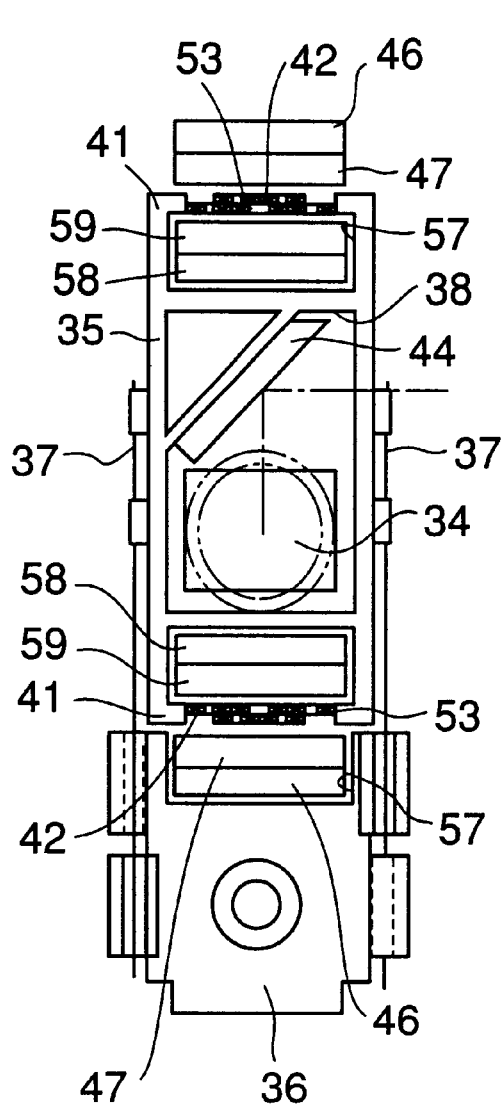
FIG. 15A is a plan view of an objective lens driving apparatus according to a fifth embodiment of the present invention.
Figure 15B:
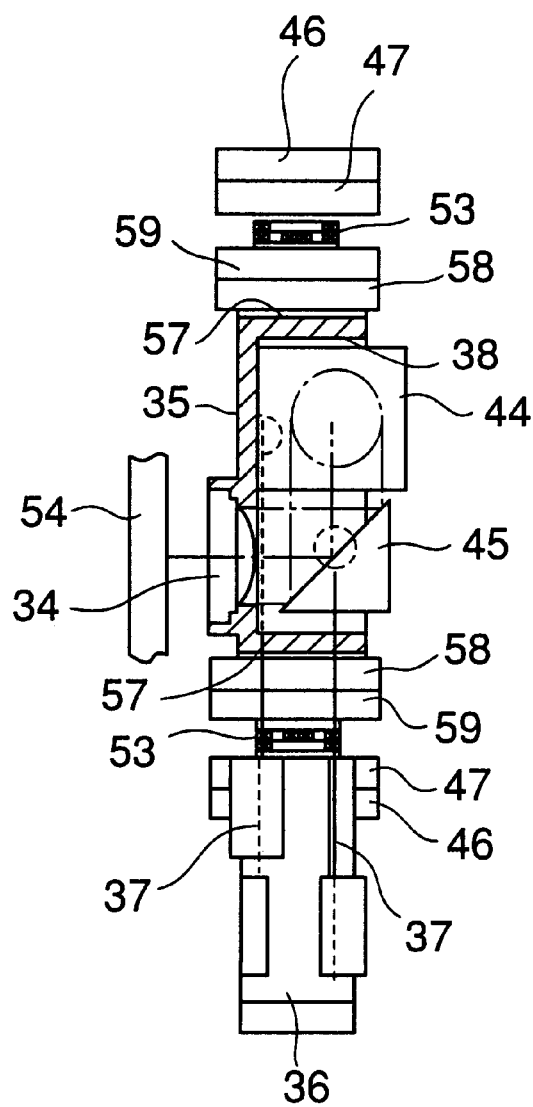
FIG. 15B is a side view of the objective lens driving apparatus shown in FIG. 15A.
Figure 16:
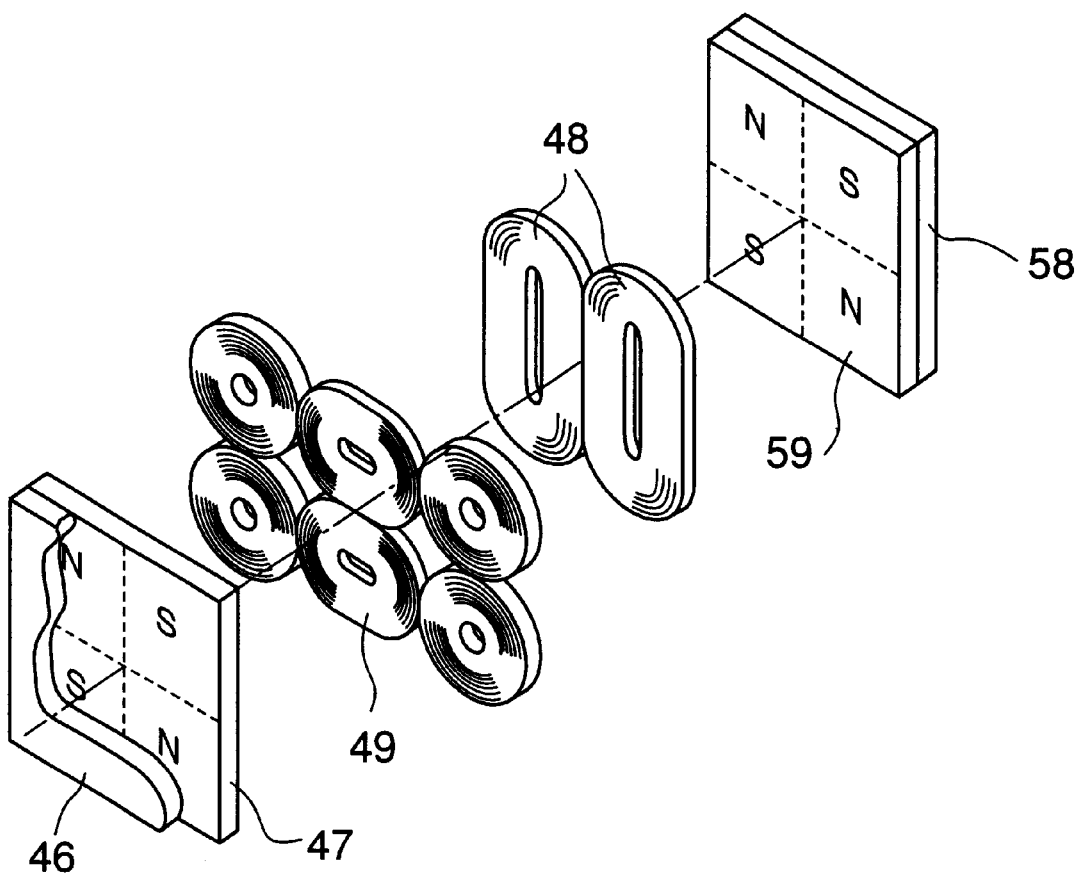
FIG. 16 is an illustration for explaining a relationship between a magnet, a focusing coil and a tracking coil provided in the objective lens driving apparatus shown in FIGS. 15A and 15B.
Figure 17A:
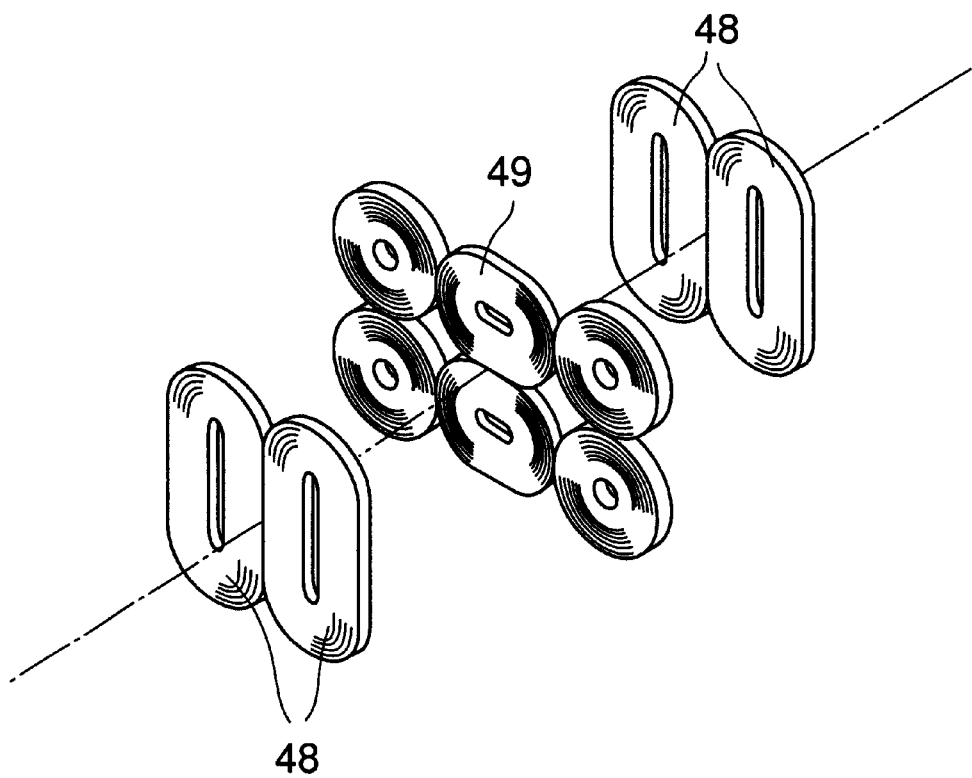
FIG. 17A is a variation of a drive coil assembly provided in the objective lens driving apparatus shown in FIGS. 15A and 15B.
Figure 17B:
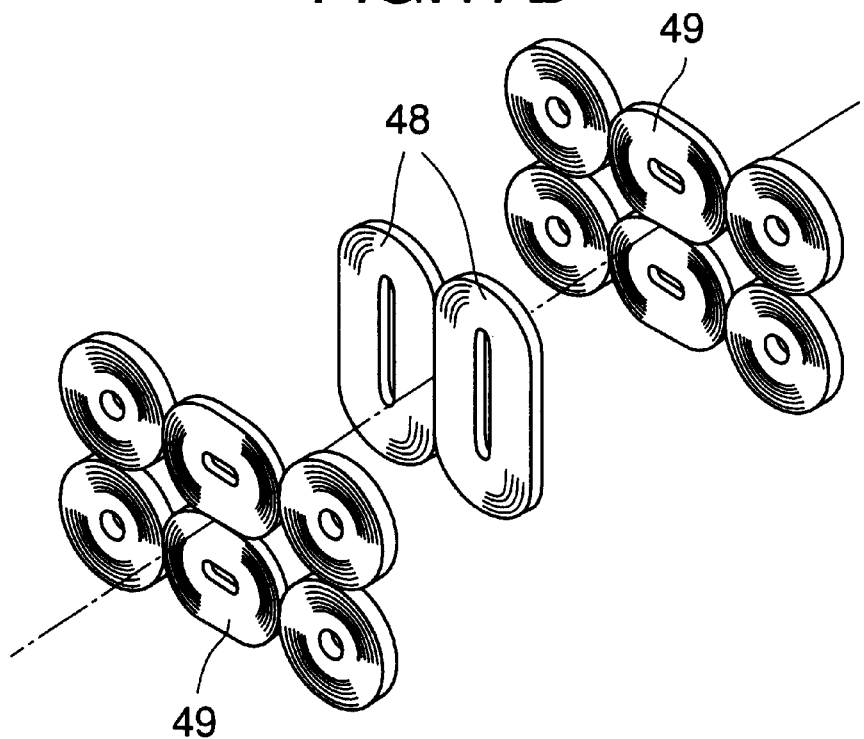
FIG. 17B is another variation of the objective lens driving apparatus shown in FIGS. 15A and 15B.

A description will now be given, with reference to FIGS. 15A, 15B and 16, of an objective lens driving apparatus according to a fifth embodiment of the present invention. FIG. 15A is a plan view of the objective lens driving apparatus according to the fifth embodiment of the present invention. FIG. 15B is a side view of the objective lens driving apparatus shown in FIG. 15A. FIG. 16 is an illustration for explaining a relationship between a magnet, a focusing coil and a tracking coil provided in the objective lens driving apparatus shown in FIGS. 15A and 15B. In FIGS. 15A, 15B and 16, parts that are the same as the parts shown in FIGS. 10, 10B and 12 are given the same reference numerals, and descriptions thereof will be omitted.

In the present embodiment, the objective lens supporting member 35 is enlarged so as to form a space 57 on each side of the inner space 38. That is, an additional wall is formed inside each of the side walls 41. The drive coil assembly 42 is embedded in each of the side walls 41. The drive magnet 47 mounted on the yoke 46 is provided so as to face the drive coil assembly 42. An additional a yoke 58 and an additional drive magnet 59 are situated in each of the spaces 57.

As shown in FIG. 16, each of the drive magnet 47 and the drive magnet 59 is magnetized so that a surface of each of the drive magnets 47 and 49 is divided into four dingle-pole areas by magnetization boundary lines "a" and "b". Directions of magnetization of each of the drive magnets 47 and 59 are perpendicular to each of the focusing direction and the tracking direction, and the direction of magnetization of each of the four single-pole areas is opposite to adjacent ones of the four single-pole areas.

The focusing coils 48 and the tracking coil assembly 49 are arranged in the same manner as the above-mentioned fourth embodiment. Accordingly, the drive motor 53 is formed by focusing coils 48, the tracking coil assembly 49, the drive magnet 47 and the additional drive magnet 53.

In the above-mentioned structure, a closed magnetic circuit is formed by the yoke 46, the drive magnet 47, the additional yoke 58 and the additional drive magnet 59. Thereby, a magnetic flux density can be increased, and distribution of the magnetic flux density can be uniform. It should be noted that one of the drive magnets 47 and 59 may be omitted so that magnetic fields are formed sorely by the remaining one of the drive magnets 47 and 59.

Additionally, as shown in FIG. 16A, a pair of the focusing coils 48 may be provided on each side of the tracking coil assembly 49 so that both a focussing force and a tracking force are substantially applied to a center of gravity of the movable part constituted by the focusing coils 48 and the tracking coil assembly 49. Accordingly, a mode of a rotation system such as pitching or yawing of the movable part can be reduced. The same effect may be obtained by providing the tracking coil assembly 49 on each side of the focusing coils 48 as shown in FIG. 16B.

Figure 18A:
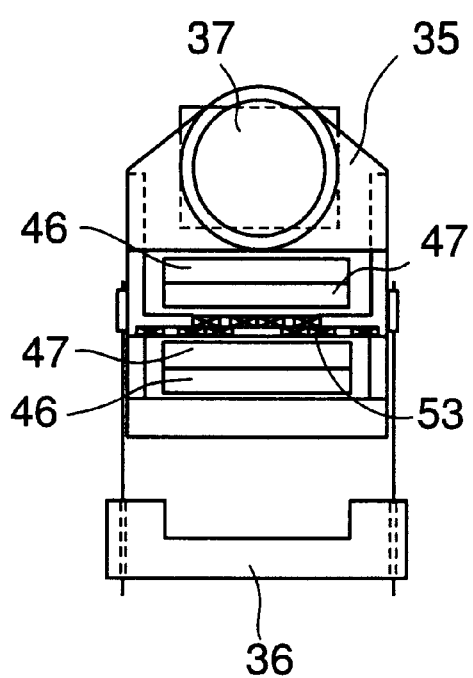
FIG. 18A is a plan view of the objective lens driving apparatus according to a sixth embodiment of the present invention.
Figure 18B:
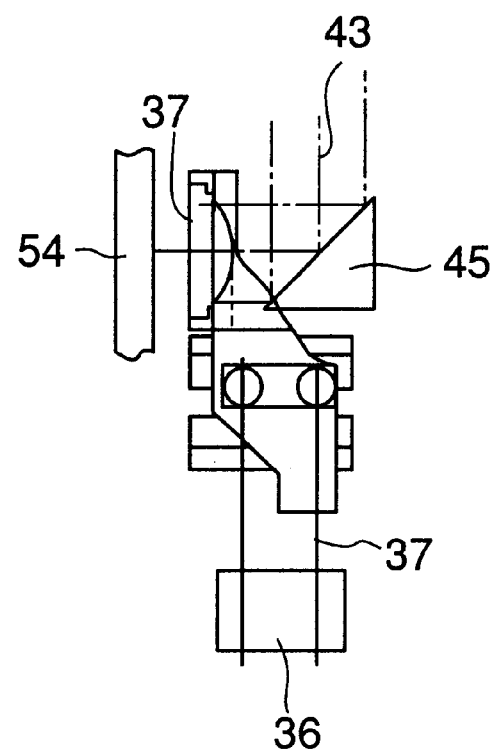
FIG. 18B is a side view of the objective lens driving apparatus shown in FIG. 18A.

A description will now be given, with reference to FIGS. 18 and 18B, of an objective lens driving apparatus according to a sixth embodiment of the present invention. FIG. 18A is a plan view of the objective lens driving apparatus according to the sixth embodiment of the present invention. FIG. 18B is a side view of the objective lens driving apparatus shown in FIG. 18A. In FIGS. 18A and 18B, parts that are the same as the parts shown in FIGS. 10A and 10B are given the same reference numerals, and descriptions thereof will be omitted.

The objective lens drive apparatus according to the present embodiment is capable of being subjected to a high acceleration by providing the drive motor on one side of the objective lens supporting member 35 according to the above-mentioned fourth embodiment. That is, the drive motor 53 located on the free end side of the objective lens supporting member 35 is omitted. Specifically, a part of the objective lens supporting member 35, which part is positioned beyond the objective lens 34, is removed. Accordingly, an end of the objective lens supporting member 35 is open. Thereby, the optical axis 43 of the light beam extends from the end of the objective lens supporting apparatus 35 to the deflection prism 45. Thus, there is no need to provide the deflection mirror 44 in this embodiment. Additionally, one of the wire springs 37 is not required to be offset in the extending direction of the wire springs 37.

Figure 19A:
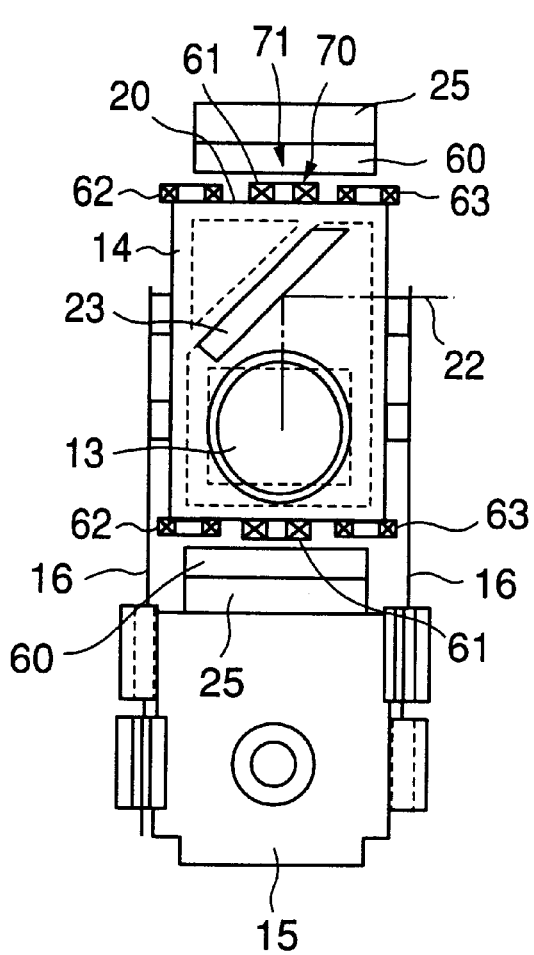
FIG. 19A is a plan view of an objective lens driving apparatus according to a seventh embodiment of the present invention.
Figure 19B:
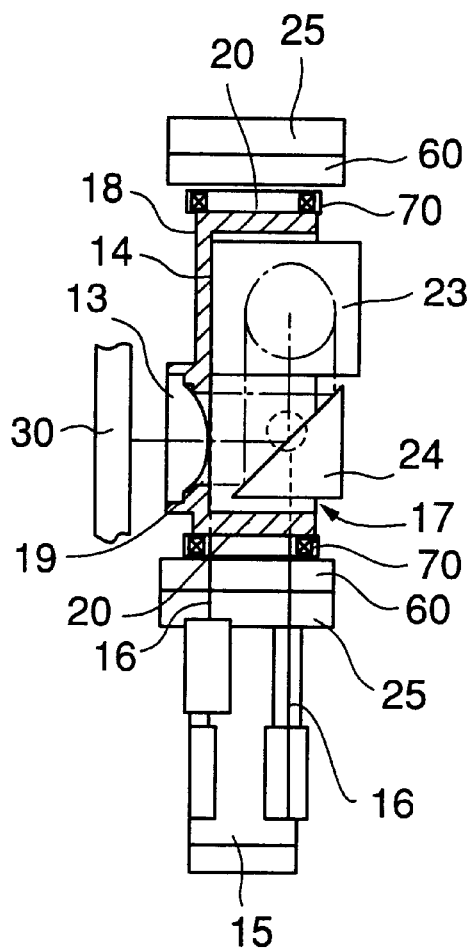
FIG. 19B is a side view of the objective lens driving apparatus shown in FIG. 19A.
Figure 19C:
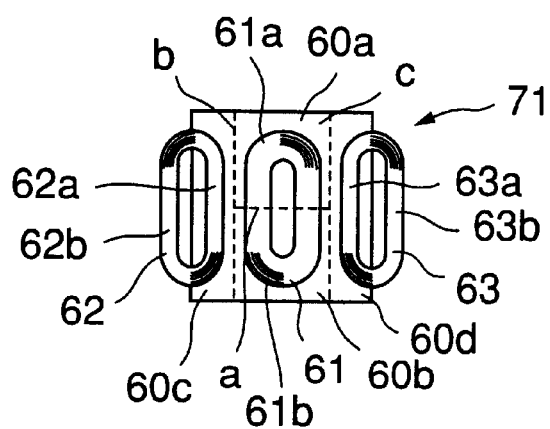
FIG. 19C is a front view of a motor part of the objective lens driving apparatus shown in FIGS. 19A and 19B.
Figure 20:
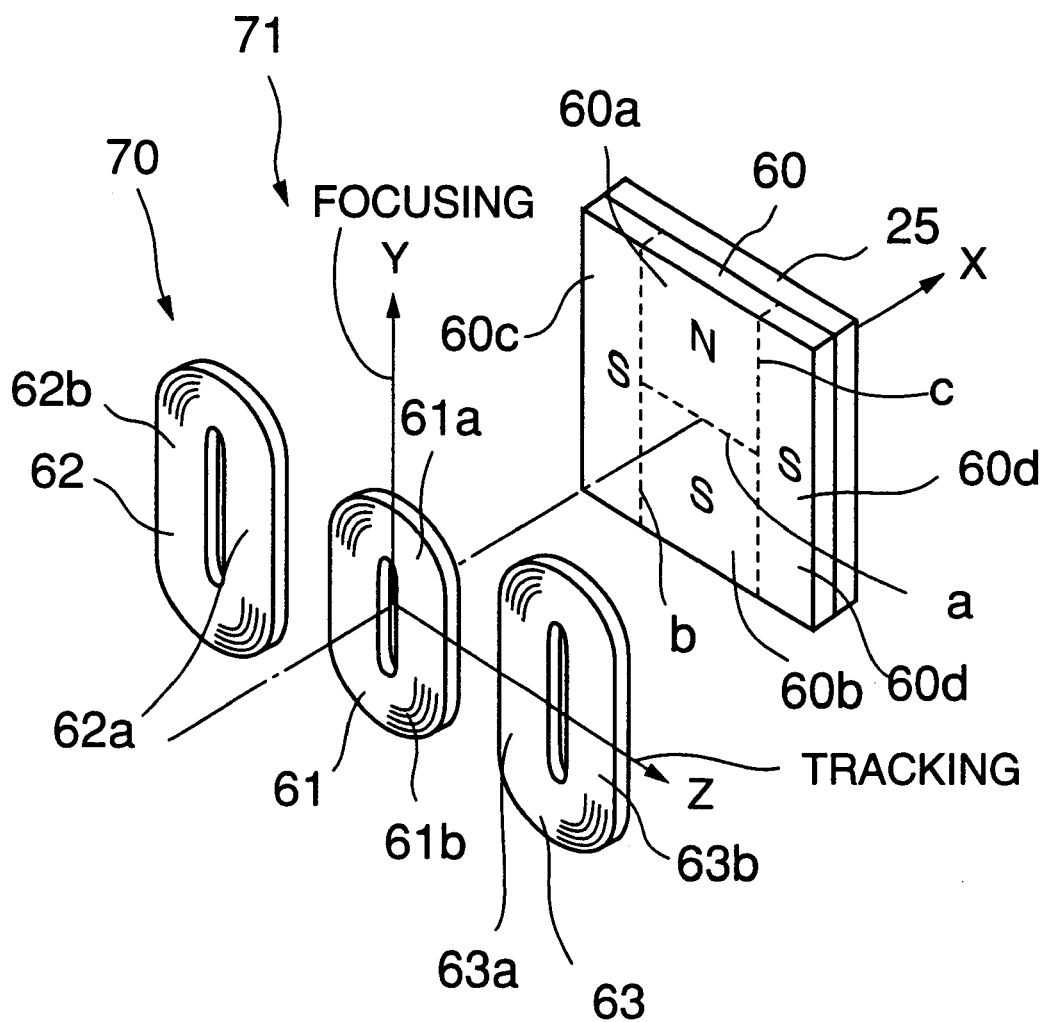
FIG. 20 is an illustration for explaining a relationship between a magnet, a focusing coil and a tracking coil provided in the objective lens driving apparatus shown in FIGS. 19A and 19B.

A description will now be given, with reference to FIGS. 19A, 19B, 19C and 20, of an objective lens driving apparatus according to a seventh embodiment of the present invention. FIG. 19A is a plan view of the objective lens driving apparatus according to the seventh embodiment of the present invention. FIG. 19B is a side view of the objective lens driving apparatus shown in FIG. 19A. FIG. 19C is a front view of a motor part of the objective lens driving apparatus shown in FIGS. 19A and 19B. FIG. 20 is an illustration for explaining a relationship between a magnet, a focusing coil and a tracking coil provided in the objective lens driving apparatus shown in FIGS. 19A and 19B. In FIGS. 19A, 19B, 19C and 20, parts that are the same as the parts shown in FIGS. 5A, 5B and 6 are given the same reference numerals.

In the objective lens driving apparatus according to the seventh embodiment of the present invention, an objective lens 13 is supported by an objective lens supporting member 14 that is elastically supported by four wire springs 16 extending from a stem 15. The objective lens supporting member 14 has a generally box-like shape so that an inner apace 17 is formed. The objective lens 13 is mounted on a bottom wall 18 of the objective lens supporting member 14. An opening 19 is formed on the bottom wall 18 so that a light beam enters the objective lens 13 by passing through the opening 19. The objective lens supporting member 14 has side walls 20 on opposite sides in an extending direction of the wire springs 16. Each of the side walls 20 serves as a base boards to which a drive coil assembly 70 is mounted. A structure of the drive coil assembly 70 will be described later.

A notch (not shown in the figure) is formed on one of the side walls of the objective lens supporting member 14 so as to pass the light beam having an optical axis 22. A movable deflection mirror 23 is provided within the inner space 17 so that the deflection mirror 23 deflects the light beam toward a deflection prism 24 which is also provided within the inner space 17. The light beam is deflected by the deflection prism 24 and incident on the objective lens 13. It should be noted that one of the wire springs 16, which one is located on the side of the side wall provided with the notch and remote from the objective lens 13, is offset in an extending direction of the spring wires 16 so that the one of the wire springs 16 does not interfere with the light beam passing through the notch.

A yoke (magnetic material) 25 and a drive magnet 60 are provided on each side of the side walls 20 so that the drive magnet 60 faces the drive coil assembly 70 with a small air gap therebetween. The drive magnet 60 is magnetized so that a surface of the drive magnet 60 is divided into four single-pole areas by magnetization boundary lines "a", "b" and "c" as shown in FIG. 19C. Directions of magnetization of the drive magnet 60 are perpendicular to both a focusing direction and a tracking direction. As shown in FIG. 18C and also in FIG. 20, the drive magnet 60 is divided into four single-pole areas 60a, 60b, 60c and 60d by the magnetization boundary lines "a", "b" and "c". The single-pole areas 60a and 60b are magnetized in opposite directions to each other, and the single-pole areas 60c and 60d are magnetized in the same direction.

As mentioned above, the drive coil assembly 70 is mounted to the objective lens supporting member 14. The drive coil assembly 70 comprises a focusing coil 61 and two tracking coils 62 and 63. The focusing coil 60 has an oblong shape (track-like shape), and faces both the single-pole parts 60a and 60b by extending over the magnetization boundary line "a". A side 61a of the focusing coil 61 faces the single-pole area 60a, and a side 61b of the focusing coil 61 faces the single-pole area 60b. Apparently, a direction of a current flowing in the side 61a of the focusing coil 61 is opposite to a direction of the current flowing in the side 61b of the focusing coil 61.

The tracking coil 62 has a side 62a and a side 62b. The side 62a faces the single-pole area 60c, and a current flows in a focusing direction in the side 62a. On the other hand, the side 62b protrudes from the single-pole area 60c so that the side 62b does not face the single-pole area 60c. Similarly, the tracking coil 63 has a side 63a and a side 63b. The side 63a faces the single-pole area 60d, and a current flows in a focusing direction in the side 63a. On the other hand, the side 63b protrudes from the single-pole area 60d so that the side 63b does not face the single-pole area 60d. Apparently, a direction of a current flowing in the side 62a of the focusing coil 62 is opposite to a direction of the current flowing in the side 62b of the focusing coil 62. Also, a direction of a current flowing in the side 63a of the focusing coil 63 is opposite to a direction of the current flowing in the side 63b of the focusing coil 63.

In the above-mentioned structure, a drive motor (actuator) 71 is formed by the focusing coil 61, the tracking coils 61, the tracking coils 62 and 63 and the drive magnet 60. It should be noted that an optical recording medium 30 such as an optical disk is located near the objective lens 13.

In the above-mentioned structure, a drive force is generated by providing a current to the focusing coil 61 and/or the tracking coils 62 and 63 due to magnetic fields generated by the drive magnet 60. Accordingly, the objective lens supporting member 14 including the objective lens 13 is movable in the focusing direction and/or the tracking direction. Specifically, the focusing force is generated in the sides 61a and 61b of the focusing coil 61. Although the direction of a current flowing in the side 61a is opposite to the direction of the current flowing in the side 61b, the direction of the focusing force generated in the side 61a is the same as the direction of the focusing force generated in the side 61b since the directions of magnetization of the single-pole parts 60a and 60b are opposite to each other. The direction of the focusing force can be reversed by changing the direction of the current supplied to the focusing coil 61. It should be noted that drive forces generated in sides other than the sides 61a and 61b are canceled since the same current flows in the sides other than the sides 61a and 61b in opposite directions.

Tracking forces are generated by the side 62a of the tracking coil 62 and the side 63a of the tracking coil 63 when a current is supplied in opposite directions between the tracking coils 62 and 63. Although a current flows in each of the side 62b of the tracking coil 62 and the side 63b of the tracking coil 63, the focusing force is not generated in the side 62b and the side 63b since the side 62b and the side 63b do not face the drive magnet 60. It should be noted that drive forces generated in opposite ends of each of the sides 62a and 63a are canceled since the same current flows in the opposite ends of each of the sides 62a and 63a in opposite directions.

According to the above-mentioned structure of the drive motor 71, the objective lens supporting member 14 including the objective lens 13 can be moved in the focusing direction and the tracking direction by controlling the magnitude and direction of the currents provided to the focusing coil 61 and each of the tracking coils 62 and 63. In this embodiment, since the focusing coil 61 and the tracking coils 62 and 63 have a small thickness and are provided only opposite ends of the objective lens supporting member 14, a light beam can be passed through a side of the objective lens supporting member 14 and the deflection mirror 23 and the deflection prism 24 can be situated inside the objective lens supporting member 14. Accordingly, an offset of the optical axis in the optical system can be reduced. Additionally, since the tracking coils 62 and 63 are not overlapped with the focusing coil 61, the thickness of the drive coil assembly 70 is small and an area adjacent to the drive magnet 60 in which area a magnetic flux density is large can be effectively used. Further, since the focusing coil 61 does not surround the drive magnet, there is no offset between the center of a part to which the focusing force is applied and the center of gravity of the movable part including the focusing coil 61. Thus, the objective lens supporting member 14 is prevented from being tilted due to such an offset.

Additionally, if currents are separately provided to each of the focusing coil 61 and the tracking coils 62 and 63, the objective lens 13 can be tilted with respect to a recording surface of the optical recording medium 30 so as to adjust an incident angle of the light beam on the optical recording medium 30. In such a case, additional lead wires must be connected to the tracking coils 62 and 63 so as to achieve electrical connection. Thus, a number of wire springs 16, which serve as lead wires for electrical connection, may be increased, or each of the wire springs 16 may be formed by a plurality of core wires.

In the above-mentioned drive motor 71, each of the focusing coil 61 and the tracking coils 62 and 63 may be formed of a sheet coil which has a layered structure. Such a sheet coil normally has 2 to 6 layers. Thereby, a positional relationship between the focusing coil 61 and each of the tracking coils 62 and 63 can be accurately maintained. Additionally, the drive coil assembly 70 can be easily fixed to the objective lens supporting member 14, and the drive coil assembly 70 can be integrally formed with the objective lens supporting member 14.

Figure 22:
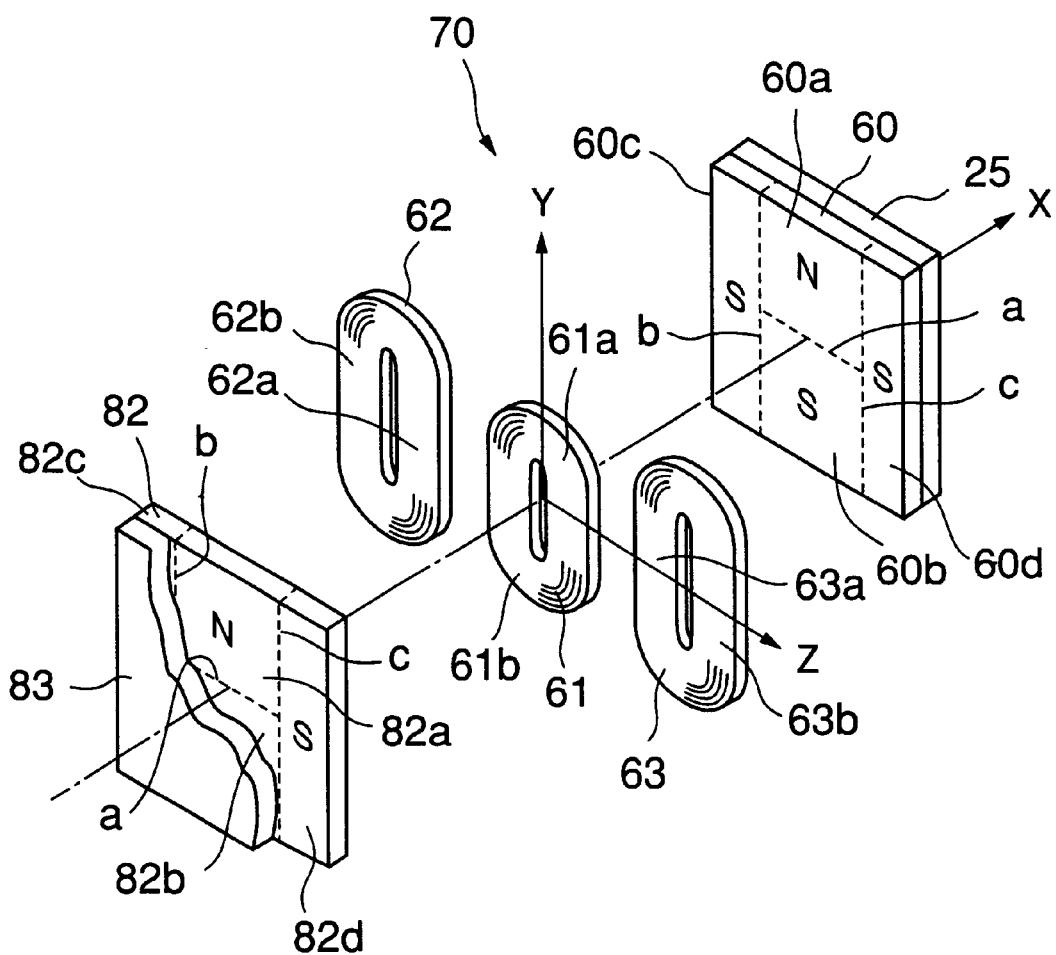
FIG. 22 is an illustration for explaining a relationship between a magnet, a focusing coil and a tracking coil provided in the objective lens driving apparatus shown in FIGS. 21A and 21B.

A description will now be given, with reference to FIGS. 21A, 21B and 22, of an objective lens driving apparatus according to an eighth embodiment of the present invention. FIG. 21A is a plan view of the objective lens driving apparatus according to the eighth embodiment of the present invention. FIG. 21B is a side view of the objective lens driving apparatus shown in FIG. 21A. FIG. 22 is an illustration for explaining a relationship between a magnet, a focusing coil and a tracking coil provided in the objective lens driving apparatus shown in FIGS. 21A and 21B. In FIGS. 21A, 21B and 22, parts that are the same as the parts shown in FIGS. 19A, 19B, 19C and 20 are given the same reference numerals, and descriptions thereof will be omitted.

In the present embodiment, similar to the above-mentioned second embodiment or the fifth embodiment, the objective lens supporting member 14 is extended so that an additional magnet 82 and an additional magnet 83 are provided with the drive coil assembly 71 being interposed between the drive magnet 60 and the additional drive magnet 82.

As shown in FIG. 22, the additional yoke (magnetic material) 83 and the additional drive magnet 82 are provided on each side of the objective lens supporting member 14 so that the drive magnet 60 and the additional drive magnet 82 faces to each other with the drive coil assembly 70 interposed therebetween. The additional drive magnet has the same structure as the drive magnet 60 that is magnetized so that a surface of the drive magnet is divided into four single-pole areas by magnetization boundary lines "a", "b" and "c" as shown in FIG. 22. Directions of magnetization of the drive magnet 82 are perpendicular to both a focusing direction (indicated by an arrow Y) and a tracking direction (indicated by an arrow Z). As shown in FIG. 22, the additional drive magnet 82 is divided into four single-pole areas 82a, 82b, 82c and 82d by the magnetization boundary lines "a", "b" and "c". The single-pole areas 82a and 82b are magnetized in opposite directions to each other, and the single-pole areas 82c and 82d are magnetized in the same direction.

In the above-mentioned structure of the drive motor 81, a closed magnetic circuit is formed by the yoke 25, the drive magnet 60, the additional drive magnet 82 and the additional yoke 32. Thereby, a magnetic flux density can be increased, and distribution of the magnetic flux density can be uniform. It should be noted that one of the drive magnets 60 and 82 may be omitted so that magnetic fields are formed sorely by the remaining one of the drive magnets 60 and 82.

Figure 23A:
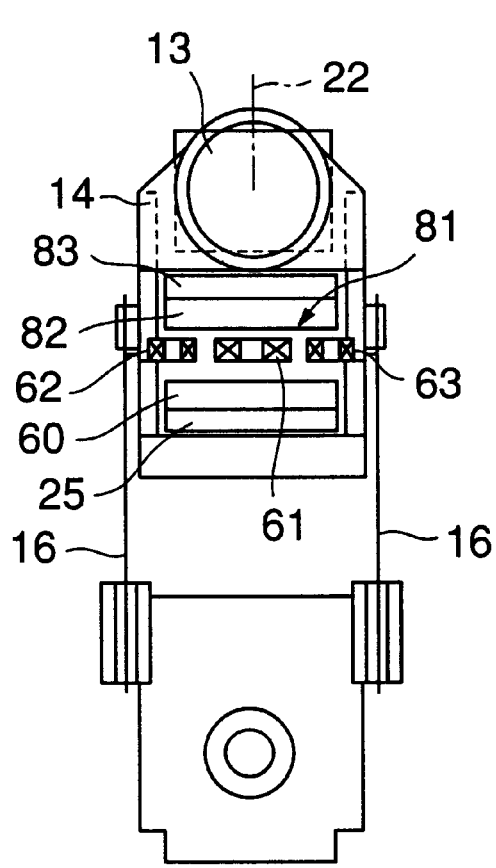
FIG. 23A is a plan view of an objective lens driving apparatus according to a ninth embodiment of the present invention.
Figure 23B:
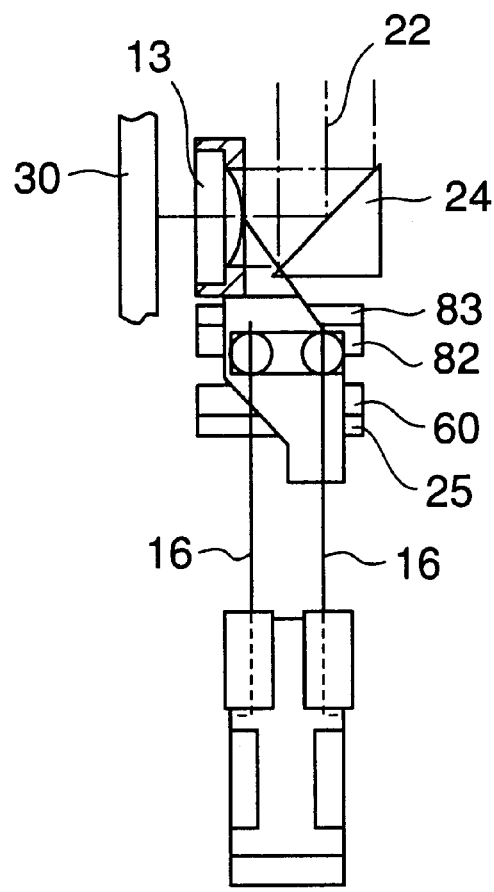
FIG. 23B is a side view of the objective lens driving apparatus shown in FIG. 23A.

A description will now be given, with reference to FIGS. 23A and 23B, of an objective lens driving apparatus according to a ninth embodiment of the present invention. FIG. 23A is a plan view of the objective lens driving apparatus according to the ninth embodiment of the present invention. FIG. 23B is a side view of the objective lens driving apparatus shown in FIG. 23A. In FIGS. 23A and 23B, parts that are the same as the parts shown in FIGS. 21A, 21B and 22 are given the same reference numerals, and descriptions thereof will be omitted.

The objective lens drive apparatus according to the present embodiment is capable of being subjected to a high acceleration by providing the drive motor on one side of the objective lens supporting member 14 according to the above-mentioned second embodiment. That is, the drive motor 81 located on the free end side of the objective lens supporting member 14 is omitted. Specifically, a part of the objective lens supporting member 14, which part is positioned beyond the objective lens 13, is removed. Accordingly, an end of the objective lens supporting member 14 is open. Thereby, the optical axis 22 of the light beam extends from the end of the objective lens supporting apparatus 14 to the deflection prism 24. Thus, there is no need to provide the deflection mirror 23 in this embodiment. Additionally, one of the wire springs 16 is not required to be offset in the extending direction of the wire springs 16.

The present invention is not limited to the specifically disclosed embodiments, and variations and modifications may be made without departing from the scope of the present invention.

The present application is based on Japanese priority applications No.10-243873 filed on Aug. 8, 1998, No.10-317517 filed on Nov. 9, 1998, No.10-364609 filed on Dec. 22, 1998 and No.11-142300 filed on May 21, 1999, the entire contents of which are hereby incorporated by reference.

What is claimed is:

1. An objective lens driving apparatus for moving an objective lens in a focussing direction and a tracking direction relative to an optical disk, said objective lens driving apparatus comprising:

an objective lens supporting member supporting said objective lens, said objective lens supporting member being movably supported on a stationary member; and a drive motor provided at least one side of said objective lens supporting member, said drive motor comprising:

a yoke fixed to the stationary member;

a drive magnet mounted to said yoke and having a flat surface parallel to both the focusing direction and the tracking direction, said flat surface having four single-pole areas each of which is magnetized in a direction perpendicular to said flat surface; and a drive coil assembly mounted on said objective lens supporting member and including a focusing coil and a tracking coil, said drive coil assembly having a flat shape so that said drive coil assembly faces said flat surface of said drive magnet in parallel relationship with a small air gap therebetween.

2. The objective lens driving apparatus as claimed in claim 1, wherein said drive motor further comprises an additional yoke fixed to the stationary member and an additional drive magnet mounted to said additional yoke, said additional drive magnet having the same magnetization structure as said drive magnet, said additional drive magnet being positioned adjacent to said drive magnet so that said drive coil assembly is interposed therebetween and a closed magnetic circuit is formed by a combination of said yoke, said drive magnet, said additional drive magnet and said additional yoke.

3. The objective lens driving apparatus as claimed in claim 1, wherein said drive magnet is formed by integrating four single-pole magnets.

4. The objective lens driving apparatus as claimed in claim 1, wherein said drive magnet is formed by integrating two double-pole magnets.

5. The objective lens driving apparatus as claimed in claim 1, wherein:

said single-pole areas of said drive magnet are defined by a first line extending in a focusing direction and a second line perpendicular to said first line and extending in the tracking direction, each of said single-pole areas is magnetized in a direction opposite to a direction of magnetization of adjacent ones of said single-pole magnets;

said focusing coil including a first focusing coil and a second focusing coil, said first focusing coil being positioned on one side of said first line and extending over said second line, said second focusing coil being positioned on the other side of said first line and extending over said second line; and said tracking coil including a first tracking coil and a second tracking coil, said first tracking coil being positioned on one side of said second line and extending over said first line, said second tracking coil being positioned on the other side of said second line and extending over said first line.

6. The objective lens driving apparatus as claimed in claim 5, wherein a current is provided individually to each of said first focusing coil and said second focusing coil so as to tilt said objective lens relative to the optical disk.

7. The objective lens driving apparatus as claimed in claim 5, wherein a current is provided individually to each of said first tracking coil and said second tracking coil so as to tilt said objective lens relative to the optical disk.

8. The objective lens driving apparatus as claimed in claim 5, wherein said first and second tracking coils are fixed on said first and second focusing coils in a layered structure so as to maintain a positional relationship between each of said first and second focusing coils and said first and second tracking coils.

9. The objective lens driving apparatus as claimed in claim 1, wherein:

said single-pole areas of said drive magnet includes a first single-pole area, a second single-pole area, a third single pole area and a fourth single pole area defined by a first line extending in the focusing direction and a second line extending in the tracking direction, said first and second single-pole areas being positioned on one side of said first line and said third and fourth single-pole areas being positioned on the other side of said first line, said first and fourth single-pole areas being positioned on one side of said second line and said second and third single-pole areas being positioned on the other side of said second line, each of said single-pole areas being magnetized in a direction opposite to a direction of magnetization of adjacent ones of said single-pole areas;

said focusing coil includes a first focusing coil and a second focusing coil, said first focusing coil being positioned on one side of said first line and extending over said second line so that a half portion overlaps said first single-pole area and the other half portion overlaps said second single-pole area, said second focusing coil being positioned on the other side of said first line and extending over said second line so that a half portion overlaps said third single-pole area and the other half portion overlaps said fourth single-pole area; and said tracking coil includes a first tracking coil, a second tracking coil and four third tracking coils, said first tracking coil being positioned on one side of said second line and extending over said first line so that a half portion overlaps said first single-pole area and the other half portion overlaps said fourth single-pole area, said second tracking coil being positioned on the other side of said second line and extending over said first line so that a half portion overlaps said second single-pole area and the other half portion overlaps said third single-pole area, a first one of said third tracking coils being positioned on one side of said first tracking coil so that at most a half portion of said first one of said third tracking coils overlaps said first single-pole area, a fourth one of said third tracking coils being positioned on the other side of said first tracking coil so that at most a half portion of said second one of said third tracking coils overlaps said fourth single-pole area, a second one of said third tracking coils being positioned on one side of said second tracking coil so that at most a half portion of said second one of said third tracking coils overlaps said second single-pole area, a third one of said third tracking coils being positioned on the other side of said second tracking coil so that at most a half portion of said third one of said third tracking coils overlaps said third single-pole area.

10. The objective lens driving apparatus as claimed in claim 9, wherein a current is provided individually to each of said first focusing coil and said second focusing coil so as to tilt said objective lens relative to the optical disk.

11. The objective lens driving apparatus as claimed in claim 9, wherein a current is provided individually to each of said first tracking coil and said second tracking coil so as to tilt said objective lens relative to the optical disk.

12. The objective lens driving apparatus as claimed in claim 9, wherein said first, second and third tracking coils are fixed on said first and second focusing coils in a layered structure so as to maintain a positional relationship between each of said first and second focusing coils and said first, second and third tracking coils.

13. The objective lens driving apparatus as claimed in claim 1, wherein:

said single-pole areas of said drive magnet includes a first single-pole area, a second single-pole area, a third single pole area and a fourth single pole area that are defined by a first line extending in the focusing direction, a second line parallel to said first line and a third line extending in the tracking direction between said first line and said second line, said first single-pole area being positioned on one side of said third line and between said first line and said second line, said second single-pole area being positioned on the other side of said third line between said first line and said second line, said third single-pole area being positioned on a side of said first line which side is opposite to a side on which said first and second single-pole areas are positioned, said fourth single-pole area being positioned on a side of said second line which side is opposite to a side on which said first and second single-pole areas are positioned, said first single-pole area being magnetized in a direction opposite to a direction of magnetization of said second single-pole area;

said focusing coil is positioned between said first line and said second line and extends over said third line so that a half portion overlaps said first single-pole area and the other half portion overlaps said second single-pole area; and said tracking coil includes a first tracking coil and a second tracking coil, said first tracking coil being positioned on one side of said focusing coil so that at most a half portion overlaps said third single-pole area, said second tracking coil being positioned on the other side of said focusing coil so that at most a half portion overlaps said fourth single-pole area.

14. The objective lens driving apparatus as claimed in claim 13, wherein a current is provided individually to each of said first tracking coil and said second tracking coil so as to tilt said objective lens relative to the optical disk.

15. The objective lens driving apparatus as claimed in claim 13, wherein said focusing coil and said first and second tracking coils are integrally formed in a single sheet coil in a layered structure.

* * * * *